US011121747B2

(12) United States Patent
Tanaka

(10) Patent No.: US 11,121,747 B2
(45) Date of Patent: Sep. 14, 2021

(54) WIRELESS COMMUNICATION DEVICE AND WIRELESS COMMUNICATION METHOD

(71) Applicant: Sony Corporation, Tokyo (JP)

(72) Inventor: Yusuke Tanaka, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/302,675

(22) PCT Filed: May 22, 2017

(86) PCT No.: PCT/JP2017/019038
§ 371 (c)(1),
(2) Date: Nov. 19, 2018

(87) PCT Pub. No.: WO2018/012111
PCT Pub. Date: Jan. 18, 2018

(65) Prior Publication Data
US 2019/0123790 A1 Apr. 25, 2019

(30) Foreign Application Priority Data
Jul. 13, 2016 (JP) .............................. JP2016-138936

(51) Int. Cl.
H04B 7/0452 (2017.01)
H04W 72/04 (2009.01)
(Continued)

(52) U.S. Cl.
CPC ............ H04B 7/0452 (2013.01); H02J 50/80 (2016.02); H04B 1/08 (2013.01); H04W 16/28 (2013.01);
(Continued)

(58) Field of Classification Search
CPC .. H04L 52/246; H04L 68/005; H04W 68/005; H02J 50/80
(Continued)

(56) References Cited

U.S. PATENT DOCUMENTS 6,304,749 B1 * 10/2001 Obara .................. H03G 3/3042
330/129
6,741,867 B1 * 5/2004 Tetsuya ................. H03F 1/3247
375/296
(Continued)

FOREIGN PATENT DOCUMENTS

CN 1156985 C 7/2004
CN 102711233 A 10/2012
(Continued)

OTHER PUBLICATIONS

Tu, Y-S., et al., "Grouping Process for MU-MIMO," Ralink Technology, doc: IEEE 802.11-10/0584r0, pp. 1-18 (May 2010).
(Continued)

Primary Examiner — Asad M Nawaz
Assistant Examiner — Jason A Harley
(74) Attorney, Agent, or Firm — Xsensus LLP

(57) ABSTRACT

A wireless communication device includes: a receiving unit that receives a first signal storing first information with which precision or accuracy of transmission power is recognized; and a transmission unit that transmits a second signal regarding permission of multiple access that allows simultaneous communication with at least one first wireless communication device identified on the basis of the first information. A wireless communication device includes: a transmission unit that transmits a first signal storing first information with which precision or accuracy of transmission power is recognized; a receiving unit that receives a second signal regarding permission of multiple access that
(Continued)

allows simultaneous communication after the transmission of the first signal; and a control unit that controls transmission of a third signal on the basis of the second signal.

17 Claims, 18 Drawing Sheets

(51) Int. Cl.
*H04W 84/12* (2009.01)
*H04W 68/00* (2009.01)
*H04W 16/28* (2009.01)
*H04W 72/12* (2009.01)
*H02J 50/80* (2016.01)
*H04B 1/08* (2006.01)

(52) U.S. Cl.
CPC ......... *H04W 68/005* (2013.01); *H04W 72/12* (2013.01); *H04W 84/12* (2013.01)

(58) Field of Classification Search
USPC .................................. 370/334; 455/452.2
See application file for complete search history.

(56) References Cited

U.S. PATENT DOCUMENTS

| | | | |
|---|---|---|---|
| 2001/0012766 A1* | 8/2001 | Ichikawa | H04W 52/265 455/69 |
| 2002/0008576 A1* | 1/2002 | Nakajima | H03F 1/0261 330/51 |
| 2002/0080734 A1* | 6/2002 | Satou | H04W 52/12 370/328 |
| 2008/0070610 A1* | 3/2008 | Nishio | H04W 52/281 455/509 |
| 2015/0171983 A1* | 6/2015 | Kusashima | H04J 11/004 370/329 |
| 2016/0123138 A1* | 5/2016 | Wu | E21B 47/00 73/152.54 |
| 2017/0070961 A1* | 3/2017 | Bharadwaj | H04L 5/0053 |
| 2017/0229922 A1* | 8/2017 | Tominaga | H02J 7/025 |

FOREIGN PATENT DOCUMENTS

| | | |
|---|---|---|
| CN | 103081528 A | 5/2013 |
| JP | 2010-537597 A | 12/2010 |
| JP | 2013005033 A | 1/2013 |
| JP | 2013-090256 A | 5/2013 |
| JP | 5592839 B2 | 9/2014 |
| WO | 2009/026769 A1 | 3/2009 |

OTHER PUBLICATIONS

English-language translation of International Search Report and Written Opinion for application No. PCT/JP2017/019038, dated Aug. 15, 2017.

* cited by examiner

WIRELESS COMMUNICATION DEVICE AND WIRELESS COMMUNICATION METHOD

CROSS-REFERENCE TO RELATED APPLICATIONS

This application is a National Stage Application based on PCT/JP2017/019038, filed on 22 May 2017, and claims priority to Japanese Patent Application No. 2016-138936, filed on 13 Jul. 2016, the entire contents of which being incorporated herein by reference.

TECHNICAL FIELD

The present disclosure relates to a wireless communication device and a wireless communication method.

BACKGROUND ART

In recent years, wireless local area networks (LANs) representative of Institute of Electrical and Electronics Engineers (IEEE) 802.11 have been widely used. In addition, the number of wireless LAN-compatible products (hereinafter, also referred to as wireless communication devices) have also increased in accordance with this. In contrast, wireless communication resources available for communication are limited. Therefore, it is desirable to increase the efficiency of communication between wireless communication devices.

As an example of technologies for increasing the efficiency of communication, there are multiple access communication technologies. For example, the multiple access communication technologies include orthogonal frequency division multiple access (OFDMA), space division multiple access (SDMA) using multi-input multi-output (MIMO), or the like. The SDMA using MIMO is called multi-user MIMO (hereinafter, also referred to as MU-MIMO).

Here, there is a concern that communication may receive interference in multiple access communication since a plurality of wireless communication devices simultaneously perform communication. Therefore, it is desirable to avoid communication interference.

Meanwhile, Patent Literature 1 discloses a technology related to a wireless communication base station device including a scheduler that decides a combination of wireless communication terminals that execute MU-MIMO communication on the basis of uplink (hereinafter, also referred to as UL) communication quality information of a plurality of wireless communication terminals that are connected to the wireless communication base station device. Also, Patent Literature 2 discloses a schedule device that selects terminals that have a single user (SU)-MIMO optimal performance scale and selects a group of wireless communication terminals that have an MU-MIMO optimal performance scale. The schedule device selects an SU-MIMO mode or an MU-MIMO mode by comparing the SU-MIMO optimal performance scale with the MU-MIMO optimal performance scale.

CITATION LIST

Patent Literature

Patent Literature 1: JP 2013-90256A
Patent Literature 1: JP 2010-537597A

SUMMARY OF INVENTION

Technical Problem

However, there is a concern that reception properties will deteriorate in conventional technologies, representative examples of which include the technologies disclosed in Patent Literatures 1 and 2. For example, precision of transmission power that affects communication quality or communication performance may generally differ depending on the individual wireless communication terminals. Therefore, there is a concern that received signals will be saturated in a case in which the transmission power is higher than expected, and there is a concern that intensity of the received signals will drop below receivable intensity in a case in which the transmission power is lower than expected. That is, there is a concern that the reception properties of signals received from wireless communication terminals in the combination decided on the basis of the communication quality information or the communication performance scale may be inferior to allowable reception properties. As a result, communication may fail, and efficiency of communication may deteriorate.

Thus, the present disclosure proposes a mechanism capable of suppressing degradation of reception properties in a case in which a plurality of wireless communication devices simultaneously perform communication.

Solution to Problem

According to the present disclosure, there is provided a wireless communication device including: a receiving unit that receives a first signal storing first information with which precision or accuracy of transmission power is recognized; and a transmission unit that transmits a second signal regarding permission of multiple access that allows simultaneous communication with at least one first wireless communication device identified on the basis of the first information.

In addition, according to the present disclosure, there is provided a wireless communication device including: a transmission unit that transmits a first signal storing first information with which precision or accuracy of transmission power is recognized; a receiving unit that receives a second signal regarding permission of multiple access that allows simultaneous communication after the transmission of the first signal; and a control unit that controls transmission of a third signal on the basis of the second signal.

According to the present disclosure, there is provided a wireless communication method including, by a processor: receiving a first signal storing first information with which precision or accuracy of transmission power is recognized; and transmitting a second signal regarding permission of multiple access that allows simultaneous communication to at least one first wireless communication device identified on the basis of the first information.

In addition, according to the present disclosure, there is provided a wireless communication method including, by a processor: transmitting a first signal storing first information with which precision or accuracy of transmission power is recognized; receiving a second signal regarding permission of multiple access that allows simultaneous communication after the transmission of the first signal: and controlling transmission of a third signal on the basis of the second signal.

Advantageous Effects of Invention

According to the present invention, a mechanism capable of suppressing degradation of reception properties in a case in which a plurality of wireless communication devices communicate with each other at the same time is provided as described above. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
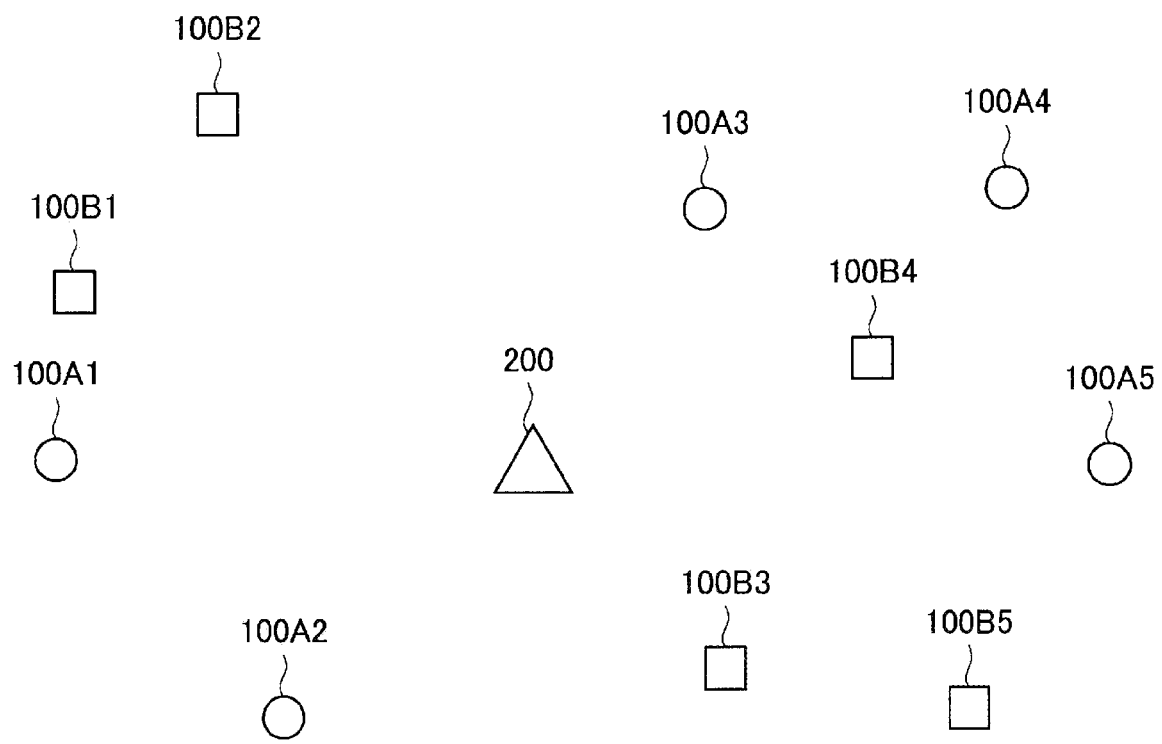
FIG. 1 is a diagram illustrating a configuration example of a wireless communication system according to each embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of elements having substantially the same function are distinguished by adding different numbers to the end of the same reference numeral. For example, a plurality of elements having substantially the same function are distinguished as necessary like a STA 100A and a STA 100B. However, in a case where it is unnecessary to distinguish elements having substantially the same function, only the same reference numeral is added. For example, in a case where it is unnecessary to particularly distinguish the STA 100A and the STA 100B, they are simply referred to as "STAs 100."

In addition, the STAs 100 according to the first to fourth embodiments will be distinguished by adding numbers corresponding to the embodiments to the ends like an STA 100-1 to an STA-100 for convenience of description. Note that the same is true for APs 200.

Note that description will be given in the following order.
1. Introduction
2. Configurations of system and device
3. First Embodiment
3.1. Functions of device
3.2. Flow of processing
3.3 Summary of first embodiment
4. Second Embodiment
4.1. Functions of device
4.2. Flow of processing
4.3. Summary of second embodiment
5. Third Embodiment
5.1. Functions of processing
5.2. Flow of processing
5.3. Summary of third embodiment
6. Fourth Embodiment
6.1. Functions of device
6.2. Flow of processing
6.3. Summary of fourth embodiment
7. Application example
8. Conclusion <1. Introduction>

First, technologies in relation to a wireless communication device in each embodiment of the present disclosure will be described. The technologies include the aforementioned multiple access communication technologies. The multiple access communication technologies include downlink (hereinafter, also referred to as DL) multiple access communication in which signals are simultaneously transmitted from an access point (AP) to a plurality of stations (STAs) and uplink multiple access communication in which signals are simultaneously transmitted from a plurality of STAs to an AP. Here, downlink MU-MIMO, which is one kind of downlink multiple access communication, has already been defined as a communication standard (IEEE 802.11ac). Meanwhile, uplink multiple access communication is currently being examined and has not been defined as a communication standard. This is because wireless LAN communication is a communication system of a random access scheme while the uplink multiple access communication has properties that are close to those of communication that a plurality of specific STAs simultaneously perform, that is, communication of a so-called control access scheme. In the stage of reviewing, the uplink multiple access communication is considered to be realized by using trigger frames or the like for designating STAs that are permitted to perform uplink multiple access communication, communication periods, and the like.

Here, the STAs that are caused to simultaneously perform communication are grouped in multiple access communication. Further, it is desirable that the group of STAs be selected such that a target value of reception properties can be secured. In a case in which reception power densities of signals received from the respective STAs in the same group are different in the AP, for example, the signals are distorted due to non-linearity or quantization of radio frequency (RF) circuits, analog circuits, or analog-digital converters included in the AP. As a result, there is a concern that reception properties such as a signal interference noise ratio (SINR) will deteriorate.

Meanwhile, collecting transmission power performance information in advance and executing grouping in multiple access communication by using the performance information is also considered. For example, the AP collects, in advance, information indicating a range of transmission power of the STAs that can be set and selects, as members of the same group, STAs with transmission power such that reception power densities in the AP fall within a predetermined range can be set, on the basis of the collected information.

However, the individual wireless communication devices typically have different precision in transmission power. There is a concern that signals will be transmitted with transmission power that is different from designated transmission power since the STAs have different precision in controlling transmission power, for example. Therefore, dispersion may occur in reception power densities, and reception properties may be degraded even if grouping is performed as described above.

Thus, the STAs 100 transmit first signals (hereinafter, also referred to as transmission power precision notification signals) storing first information (hereinafter, also referred to as transmission power precision information) with which precision or accuracy (hereinafter, collectively referred to as precision) of transmission power is recognized, and the AP 200 executes grouping in multiple access communication on the basis of transmission power precision information stored in the received transmission power precision notification signal, in the present disclosure. In this manner, it is possible to form a group of STAs 100 such that reception power densities of the signals received from the STAs 100 fall within a predetermined range in the AP 200 even if precision of transmission power of the STAs 100 is dispersed. Therefore, it is possible to suppress degradation of reception properties in a case in which the plurality of STAs 100 and the AP 200 simultaneously perform communication.

<2. Configurations of System and Device>

Next, configurations of the wireless communication system according to each embodiment of the present disclosure and of the wireless communication device for realizing the wireless communication system will be described. First, the configuration of the wireless communication system will be described with reference to FIG. 1. FIG. 1 is a diagram illustrating a configuration example of the wireless communication system according to each embodiment of the present disclosure.

As illustrated in FIG. 1, the wireless communication system includes an AP 200 and a plurality of STAs 100 as wireless communication devices. The AP 200 and the STAs 100 can communicate with each other and perform communication after establishing connection for communication. Further, STAs 100A and STAs 100B have different precision of transmission power. For example, precision of transmission power of STAs 100A1 to 100A5 as illustrated in FIG. 1 is higher than that of STAs 100B1 to 100B5.

Figure 2:
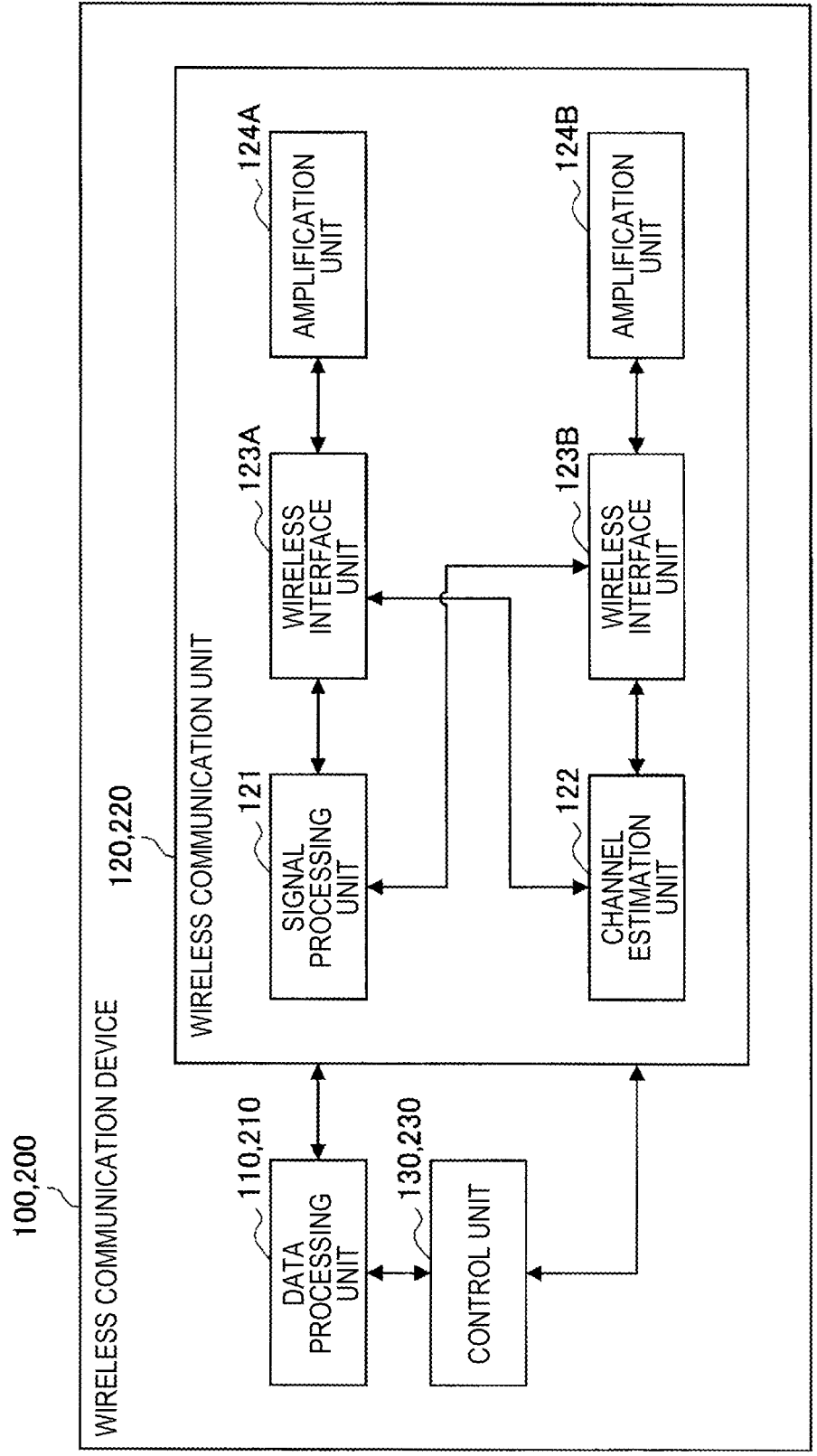
FIG. 2 is a block diagram schematically illustrating functional configurations of an STA and an AP according to each embodiment of the present disclosure.

Next, functional configurations and basic functions of the STAs 100 and the AP 200 will be described with reference to FIG. 2. FIG. 2 is a block diagram schematically illustrating an example of the functional configurations of the STAs 100 and the P 200 according to each embodiment of the present disclosure. Note that since the functional configurations of the STAs 100 and the AP 200 are substantially the same, only the STAs 100 will be described.

As illustrated in FIG. 2, each of the STAs 100 includes a data processing unit 110, a wireless communication unit 120, and a control unit 130. Note that a power source unit that supplies electric power to the respective functions is provided in each of the STAs 100 although they are not illustrated in the drawing. The power source unit is realized by a fixed power source, a battery, or the like.

(Data Processing Unit)

The data processing unit 110 performs processing for transmitting and receiving data. Specifically, the data processing unit 110 generates a frame (or a packet) on the basis of data from a higher communication layer and provides the generated frame to a signal processing unit 121, which will be described later. For example, the data processing unit 110 performs processing of generating a frame from data and adding a media access control (MAC) header for MAC or adding a detection code or the like to the generated frame. Also, the data processing unit 110 extracts data from a received frame and provides the extracted data to a higher communication layer. For example, the data processing unit 110 acquires data by performing, on the received frame, analysis of the MAC header, code error detection and correction, reordering processing, and the like.

(Wireless Communication Unit)

The wireless communication unit 120 includes a signal processing unit 121, a channel estimation unit 122, a wireless interface unit 123, and an amplification unit 124 as illustrated in FIG. 2.

The signal processing unit 121 performs modulation processing on a frame. Specifically, the signal processing unit 121 generates a symbol stream by performing encoding, interleaving, and modulation on a frame provided from the data processing unit 110 in accordance with coding and a modulation scheme set by the control unit 130. In addition, the signal processing unit 121 acquires a frame by performing demodulation, decoding, or the like on a symbol stream obtained through spatial processing and provides the acquired frame to the data processing unit 110 or the control unit 130.

In addition, the signal processing unit 121 performs processing related to space division multiplexing communication. Specifically, the signal processing unit 121 performs signal processing related to space separation on the generated symbol stream and provides each symbol stream obtained through the processing to the wireless interface unit 123. Also, the signal processing unit 121 performs spatial processing, for example, separation processing or the like of a symbol stream on a symbol stream related to a signal obtained from the wireless interface unit 123.

In addition, the signal processing unit 121 may perform other processing related to multiplexing communication. For example, the signal processing unit 121 may perform processing related to frequency division multiplexing communication, orthogonal frequency division multiplexing communication, or code division multiplexing communication.

The channel estimation unit 122 estimates a channel gain. Specifically, the channel estimation unit 122 calculates complex channel gain information from a preamble part or a training signal part of the signal related to the symbol stream obtained from the wireless interface unit 123. Note that the calculated complex channel gain information is provided to the signal processing unit 121 via the control unit 130 or directly and is then used for modulation processing, space separation processing, and the like.

The wireless interface unit 123 generates signals to be transmitted and received via an antenna. Specifically, the wireless interface unit 123 converts a signal related to a symbol stream provided from the signal processing unit 121 into an analog signal, performs filtering thereon, and performs frequency up-converting. Then, the wireless interface unit 123 provides the obtained signal to the amplification unit 124. Also, the wireless interface unit 123 performs processing, which is opposite to that in signal transmission, for example, frequency down-converting, digital signal conversion, or the like on the signal obtained from the amplification unit 124 and provides the signal obtained through the processing to the channel estimation unit 122 and the signal processing unit 121.

The amplification unit 124 amplifies the signal. Specifically, the amplification unit 124 amplifies the analog signal provided from the wireless interface unit 123 to predetermined electric power and causes the signal obtained through the amplification to be transmitted via the antenna. Also, the amplification unit 124 amplifies a signal related to electric waves received via the antenna to predetermined electric power and provides the signal obtained through the amplification to the wireless interface unit 123. The amplification unit 124 is realized by a power amplification module, for example. Note that either or both of a function of amplifying transmission electric waves and a function of amplifying reception electric waves of the amplification unit 124 may be incorporated in the wireless interface unit 123.

Note that, although FIG. 2 describes the example of the configurations (the wireless interface units 123A and 123B and the amplification units 124A and 124B) in a case in which two antennas are provided in each STA 100, the number of antennas provided may be three or more or may be one.

(Control Unit)

The control unit 130 controls overall operations of each STA 100. Specifically, the control unit 130 performs processing such as exchange of information between the respective functions, setting of communication parameters, and scheduling of a frame in the data processing unit 110. In particular, the control unit 130 performs control of transmission power, a notification of transmission power precision information, formation of a group for multiple access communication based on the transmission power precision information, and control of communication and the like based on the notification of the group and the group in the notification.

<3. First Embodiment>

Next, the first embodiment of the present disclosure will be described. In the first embodiment, a plurality of STAs 100-1 are divided into a group that performs multiple access communication and a group that performs single access communication on the basis of transmission power precision information.

<3.1. Functions of Device>

First, the respective functions of the STAs 100-1 and an AP 200-1 that serve as wireless communication devices according to the embodiment will be described.

(Notification of Transmission Power Precision Information)

Each STA 100-1 notifies the AP 200-1 of transmission power precision information (first information). Specifically, the control unit 130 causes the data processing unit 110 to generate a transmission power precision notification signal (first signal) storing transmission power precision information if a transmission power precision information transmission timing is reached. Then, the wireless communication unit 120 transmits the generated transmission power precision notification signal. Meanwhile, the AP 200-1 receives the transmission power precision information. Specifically, the data processing unit 210 acquires transmission power precision information from the transmission power precision notification signal received by the wireless communication unit 220. Then, the acquired transmission power precision information is provided to the control unit 230.

The transmission power precision information includes information related to an error between a setting value and an actually measured value of transmission power (hereinafter, also referred to as error information). For example, the error information may be information indicating a numerical value of the error between the setting value and the actually measured value or may be information indicating a grade classified in accordance with the numerical value of the error. Note that the error information may be set in a stage of manufacturing or testing each STA 100-1 or the like or may be set or updated later on the basis of an instruction from a user of each STA 100-1 or the AP 200-1.

Note that the transmission power precision notification signal may be a dedicated frame for communicating the transmission power precision information or may be a frame for another purpose that has a field in which the transmission power precision information is stored. In addition, the transmission power precision notification signal may be transmitted at predetermined time intervals, may be transmitted in a case in which a predetermined condition is satisfied, or may be transmitted on the basis of a transmission request from the AP 200-1. In addition, the transmission power precision notification signal may be communicated by using either the multiple access communication scheme or the single access communication scheme.

(Formation of Group)

The AP 200-1 decides a group of the STAs 100-1 that perform multiple access communication (hereinafter, also referred to as a multiple access communication group) on the basis of the transmission power precision information. Specifically, the control unit 230 identifies at least one STA 100-1 as a member of the multiple access communication group on the basis of the transmission power precision information. More specifically, the control unit 230 decides the multiple access communication group on the basis of transmission power control information and a threshold value. For example, the control unit 230 identifies the STAs 100-1 with the transmission power precision information that is equal to or greater than the threshold value as members of the multiple access communication group. In detail, the control unit 230 decides the STAs 100-1 with numerical values of errors related to precision of transmission power that are less than the threshold value, in grades of errors that are less than the threshold value, or with evaluation values in relation to the errors that are equal to or greater than the threshold value as members of the multiple access communication group.

In addition, the AP 200-1 decides a group of the STAs 100-1 that perform single access communication (hereinafter, also referred to as a multiple access communication group) on the basis of the transmission power precision information. Specifically, the control unit 230 decides the single access communication group on the basis of transmission power control information and a threshold value. For example, the control unit 230 identifies the STAs 100-1 with the transmission power precision information that is less than the threshold value as members of the single access communication group. In detail, the control unit 230 decides the STAs 100-1 with numerical values of errors related to precision of transmission power that are equal to or greater than the threshold value, in grades of errors that are equal to or greater than the threshold value, or with evaluation values in relation to the errors that are less than the threshold value as members of the single access communication group.

Although the example in which the group is formed by using the threshold value of the transmission power precision information has been described above, the group may be formed on the basis of a relative relationship between pieces of transmission power precision information provided in notifications from the plurality of STAs 100-1. For example, the group of the STAs 100-1 may be divided into a higher group and a lower group in ranking of the numerical values of the errors related to precision of transmission power.

(Notification of Group)

The AP 200-1 notifies the STAs 100-1 of the decided group via communication. Specifically, the control unit 230 causes the data processing unit 210 to generate a group notification signal (second signal) for providing a notification of the multiple access communication group directed to the members of the decided multiple access communication group, and the generated signal is transmitted by the wireless communication unit 220. For example, the control unit 230 causes the data processing unit 210 to generate a group notification frame for providing a notification of the multiple access communication group directed to the STAs 100-1 decided as the members of the multiple access communication group. Then, the generated group notification frame is transmitted by the wireless communication unit 220.

In addition, the control unit 230 causes the data processing unit 210 to generate a group notification signal for providing a notification about a decided single access communication group, and the generated signal is transmitted by the wireless communication unit 220. For example, the control unit 230 causes the data processing unit 210 to generate a group notification frame for providing a notification of the single access communication group directed to the STAs 100-1 decided as members of the single access communication group. Then, the generated group notification frame is transmitted by the wireless communication unit 220. Note that the control unit 230 may not transmit the group notification frame to the STAs 100-1 decided as the single access communication group.

Group assignment information is stored in the group notification signal. Specifically, the group assignment information is information with which the STAs 100-1 are identified in the assigned group or information indicating a group to which the STAs 100-1 belong. For example, identification information or a group ID of the STAs 100-1, which is unique in the group, is stored in the group notification frame. Note that the group notification signal may be realized by a transmission permission signal, which will be described later. For example, the group assignment information is stored in the transmission permission signal.

The STAs 100-1 register the group in the notification provided from the AP 200-1. Specifically, the data processing unit 110 determines whether or not a destination of the group notification frame received by the wireless communication unit 120 is the STAs 100-1 themselves. If it is determined that the STAs 100-1 themselves are the destination, the data processing unit 110 acquires group assignment information from the group notification frame, and the acquired group assignment information is stored in a storage unit (not illustrated).

(Notification of Transmission Permission)

The AP 200-1 notifies each group of transmission permission via communication. Specifically, the control unit 230 causes the data processing unit 210 to generate a transmission permission signal (second signal) directed to the STAs 100-1 that are the members of the multiple access communication group after the transmission of the group notification signal, and the generated transmission permission signal is transmitted by the wireless communication unit 220. For example, the control unit 230 causes the data processing unit 210 to generate a trigger frame directed to the STAs 100-1 decided as the members of the multiple access communication group. Then, the generated trigger frame is transmitted by the wireless communication unit 220. Note that in a case in which a plurality of multiple access communication groups are decided, the trigger frame is transmitted for each of the multiple access communication groups.

Communication parameter information used in signal transmission is stored in the transmission permission signal. For example, the communication parameter information includes information such as a transmission period, transmission power, and a modulation and coding set (MCS). Note that the communication parameter information stored in the transmission permission signal may be different for each of the plurality of multiple access communication groups or may be different from communication parameters that the STAs 100-1 that are the members of single access communication group use in communication. Also, the communication parameter information may be stored in the aforementioned group notification signal. In addition, the transmission permission signal may be a signal for another purpose that has a field in which the information indicating transmission permission and the communication parameter information are stored.

(Multiple Access Communication)

The STAs 100-1 control transmission of a signal (third signal) on the basis of a notification of a group and a notification of transmission permission. Specifically, the control unit 130 controls transmission of a signal based on a communication parameter stored in a transmission permission signal in response to reception of the transmission permission signal directed to a multiple access communication group in the notification provided through the group notification signal. If a trigger frame is received, for example, the data processing unit 110 determines whether or not a multiple access communication group that is a destination of the trigger frame is a registered group to which the STAs 100-1 themselves belong. When it is determined that the destination of the trigger frame is a group that has already been registered, the data processing unit 110 acquires communication parameter information to be stored in the trigger frame, and the control unit 130 sets a communication parameter such as transmission power or MCS on the basis of the acquired communication parameter. If a transmission period indicated by the acquired communication parameter information has arrived, then the control unit 130 causes the data processing unit 110 to generate a frame, and the generated frame is transmitted by the wireless communication unit 120. Similar processing is executed in the other STAs 100-1 that belong to the same multiple access communication group. As a result, frequency division multiplexing, space division multiplexing, or code division multiplexing is performed on the frame transmitted from the respective STAs 100-1, and the multiple access communication is realized.

The AP 200-1 receives frames that are transmitted from the plurality of STAs 100-1 after the transmission of the trigger frame and are then multiplexed. Specifically, the wireless communication unit 220 separates the respective frames from a multiplexed frame received after the transmission of the trigger frame, and the data processing unit 210 performs reception processing on the separated frames. Then, data obtained through the reception processing is provided to a higher communication layer, the control unit 230, or the like.

(Single Access Communication)

The STAs 100-1 controls transmission of a signal on the basis of a notification of a group. Specifically, if a notification of assignment to a single access communication group is provided through a group notification signal, and the single access communication group is registered, the control unit 130 controls transmission of a signal in a transmission period that is different from that of multiple access communication. For example, the control unit 130 executes single access communication after elapse of a predetermined time from an end of multiple access communication performed after reception of a trigger frame. Note that the single access communication may be executed before execution of multiple access communication, that is, before communication of the trigger frame.

<3.2. Flow of Processing>

Figure 3:
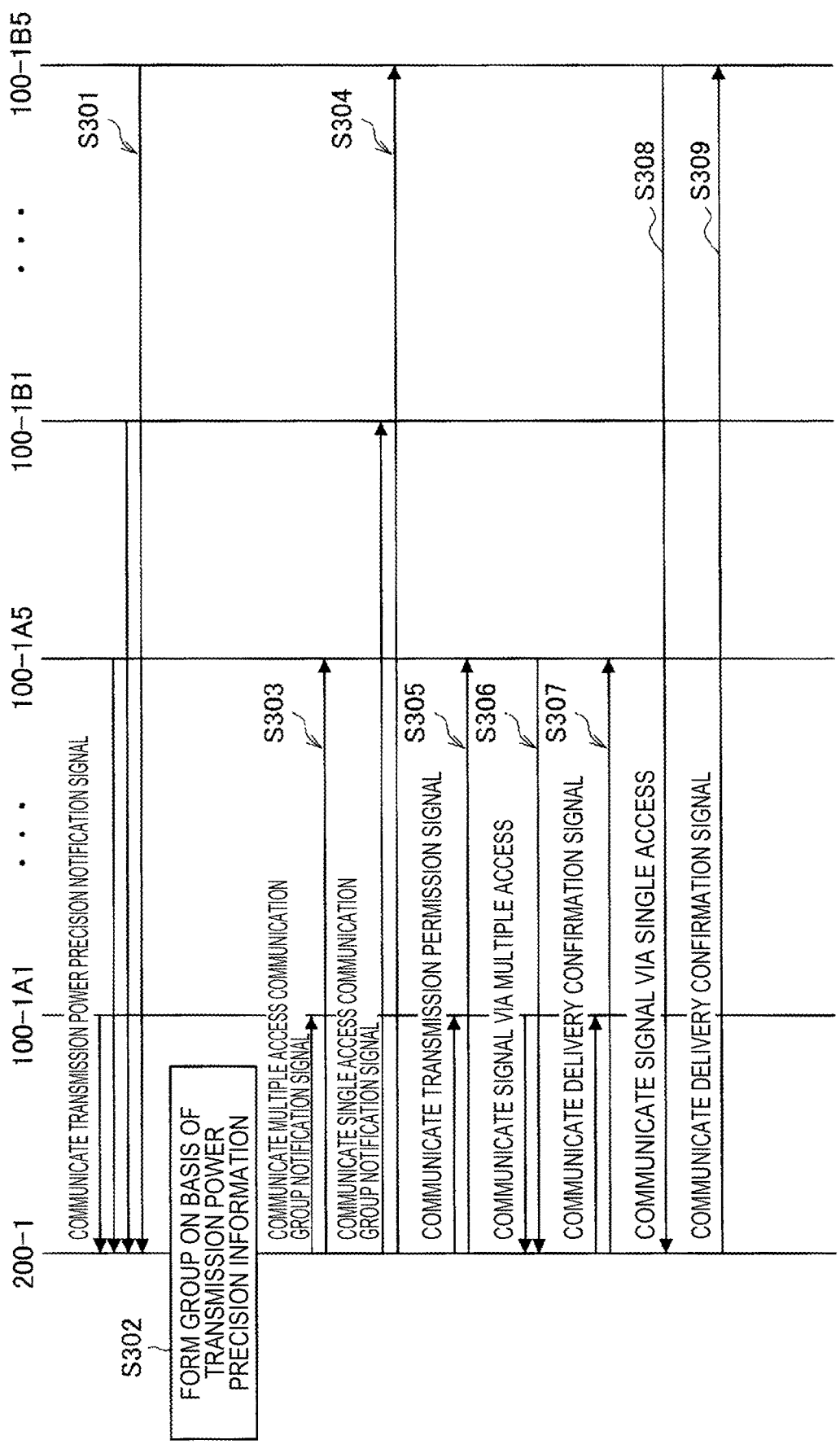
FIG. 3 is a sequence diagram schematically illustrating an example of the wireless communication system according to the embodiment.

Next, a flow of processing of the wireless communication system according to the embodiment will be described with reference to FIG. 3. FIG. 3 is a sequence diagram conceptually illustrating an example of the processing of the wireless communication system according to the embodiment.

STAs 100-1A1 to 100-1A5 and STAs 100-1B1 to 100-1B5 transmit transmission power precision notification signals to the AP 200-1 (Step S301). The AP 200-1 that has received the transmission power precision notification signals forms groups on the basis of the transmission power precision information (Step S302). Next, the AP 200-1 transmits multiple access communication group notification signals to the STAs 100-1A1 to 100-1A5 that are members of the multiple access communication groups (Step S303). Also, the AP 200-1 transmits single access communication group notification signals to the STAs 100-1B1 to 100-1B5 that are the members of the single access communication group (Step S304).

Next, the AP 200-1 transmits transmission permission signals to the STAs 100-1A1 to 100-1A5 that are the members of the multiple access communication group (Step S305). The STAs 100-1A1 to 100-1A5 that have received the transmission permission signals transmit signals to the AP 200-1 (Step S306). Note that frames transmitted from the STAs 100-1A1 to 100-1A5 are subjected to frequency division multiplexing, space division multiplexing, or code division multiplexing. The AP 200-1 that has received the multiplexed signals transmits delivery confirmation signals to the respective STAs 100-1A1 to 100-1A5 that are transmission sources of the received signals (Step S307).

After the multiple access communication ends, the STAs 100-1B1 to 100-1B5 that are the members of the single access communication group transmit signals to the AP 200-1 (Step S308). The AP 200-1 that has received non-multiplexed signals transmits delivery confirmation signals to the respective STAs 100-1B1 to 100-1B5 that are transmission sources of the received signals (Step S309).

Then, processing of the STAs 100-1 and the AP 200-1 according to the embodiment will be individually described.

(Processing of AP)

Figure 4:
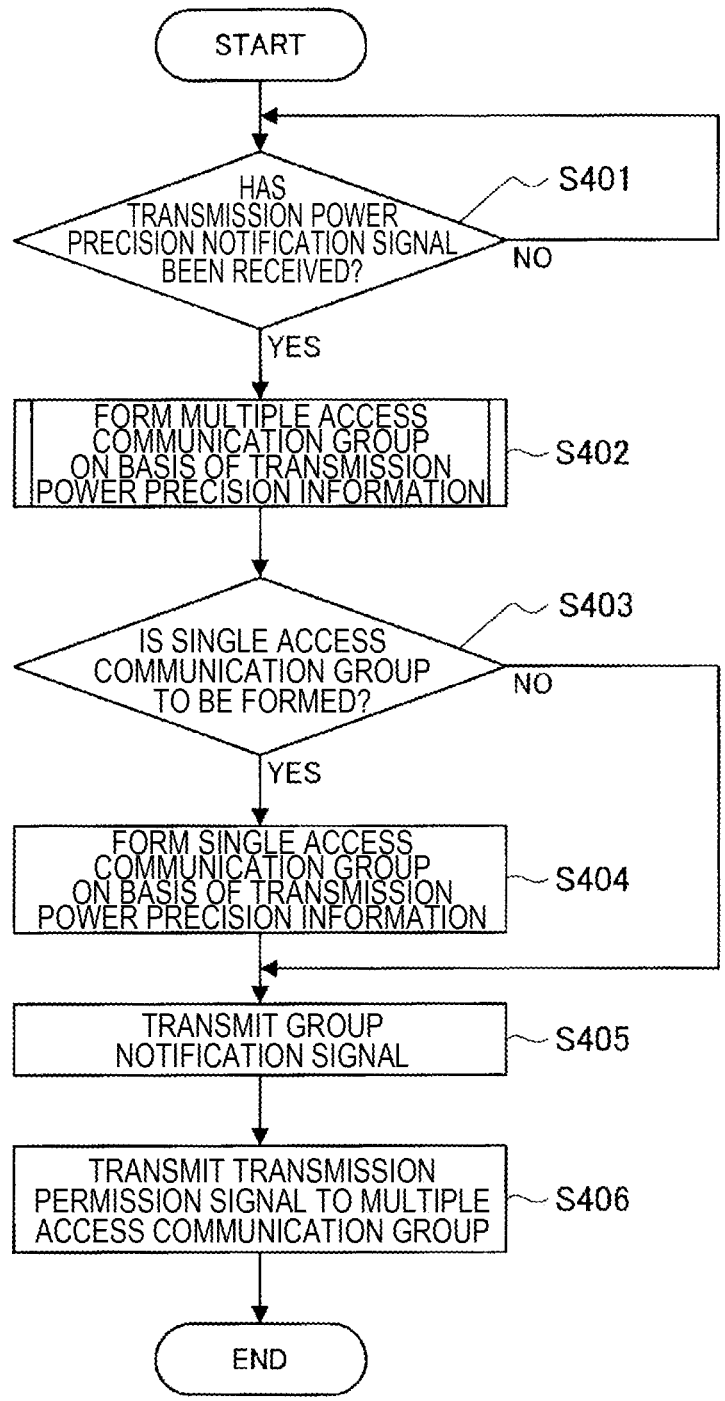
FIG. 4 is a flowchart conceptually illustrating an example of overall processing of the AP according to the embodiment.

First, overall processing of the AP 200-1 will be described with reference to FIG. 4. FIG. 4 is a flowchart conceptually illustrating an example of overall processing of the AP 200-1 according to the embodiment.

If it is determined that the transmission power precision notification signals have been received (Step S401/YES), the AP 200-1 forms multiple access communication groups on the basis of the transmission power precision information (Step S402). Specifically, the control unit 230 forms the multiple access communication groups on the basis of the transmission power precision information stored in received transmission power precision notification frames and a threshold value. Note that details thereof will be described later.

In addition, if it is determined that a single access communication group is to be formed (Step S403/YES), the AP 200-1 forms the single access communication group on the basis of the transmission power precision information (Step S404). Specifically, the control unit 230 forms the single access communication group on the basis of the transmission power precision information stored in the received transmission power precision notification frames and the threshold value. Note that the single access communication group may not be formed.

Next, the AP 200-1 transmits group notification signals (Step S405). Specifically, the control unit 230 causes the data processing unit 210 to generate multiple access communication group notification frames for providing the notifications of the formed multiple access communication group, and the generated frame is transmitted by the wireless communication unit 220. In addition, the control unit 230 causes the data processing unit 210 to generate the single access communication group notification frames for providing the notifications of the formed single access communication group, and the generated frames are transmitted by the wireless communication unit 220. Note that in a case in which the single access communication group is not formed, the single access communication group notification frames are not transmitted.

Thereafter, the AP 200-1 transmits transmission permission signals to the multiple access communication group (Step S406). Specifically, the control unit 230 causes the data processing unit 210 to generate trigger frames storing communication parameter information directed to the STAs 100-1 that are the members of the multiple access communication group after the transmission of the multiple access communication group notification frames. Then, the generated trigger frames are transmitted by the wireless communication unit 220.

Note that the multiple access communication with the STAs 100-1 that are the members of the multiple access communication group is performed and the single access communication with the STAs 100-1 that are the members of the single access communication group is then performed. Specifically, the wireless communication unit 220 receives frames simultaneously transmitted from the STAs 100-1 and multiplexed and separates the respective frames. Then, the data processing unit 210 performs reception processing on the respective frames obtained through the separation and provides data obtained through the reception processing to the higher communication layer or the control unit 230. In addition, if the frames are received by the wireless communication unit 220, the control unit 230 causes the data processing unit 210 to generate acknowledgement (ACK) frames directed to transmission sources of the received frames and causes the wireless communication unit 220 to transmit the generated ACK frames.

Figure 5:
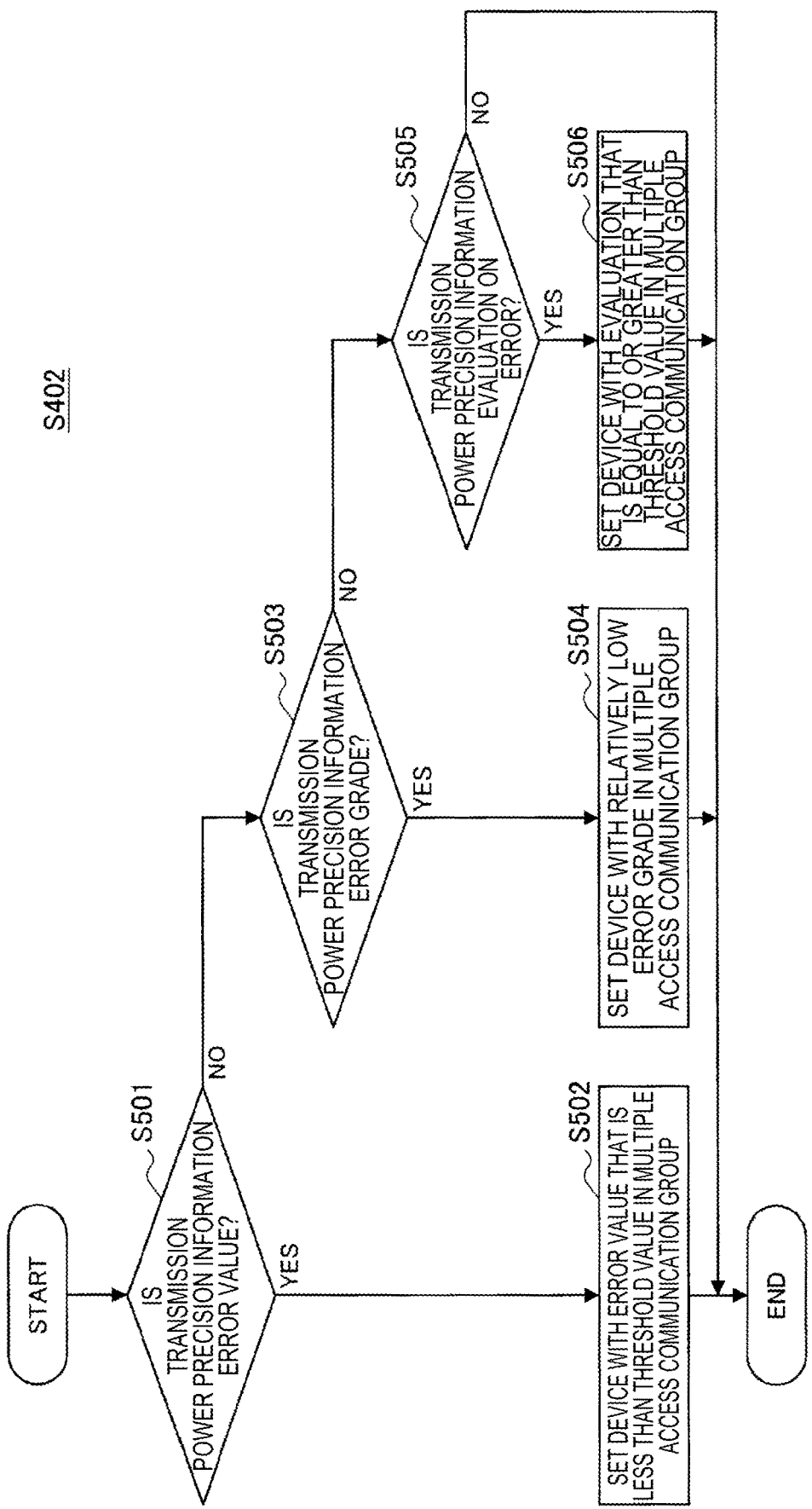
FIG. 5 is a flowchart conceptually illustrating an example of multiple access communication group formation processing in the AP according to the embodiment.

Further, multiple access communication group formation processing of the AP 200-1 will be described in detail with reference to FIG. 5. FIG. 5 is a flowchart conceptually illustrating an example of multiple access communication group formation processing of the AP 200-1 according to the embodiment.

In a case in which the transmission power precision information is an error value (Step S501/YES), the AP 200-1 sets STAs 100-1 with error values that are less than a threshold value in the multiple access communication group (Step S502).

In addition, in a case in which the transmission power precision information is an error grade (Step S503/YES), the AP 200-1 sets the STAs 100-1 with relatively low error grades in the multiple access communication group (Step S504).

In addition, in a case in which the transmission power precision information is an error evaluation value (Step S505/YES), the AP 200-1 sets the STAs 100-1 with evaluation values that are equal to or greater than a threshold value in the multiple access communication group (Step S506).

(Processing of STA)

Figure 6:
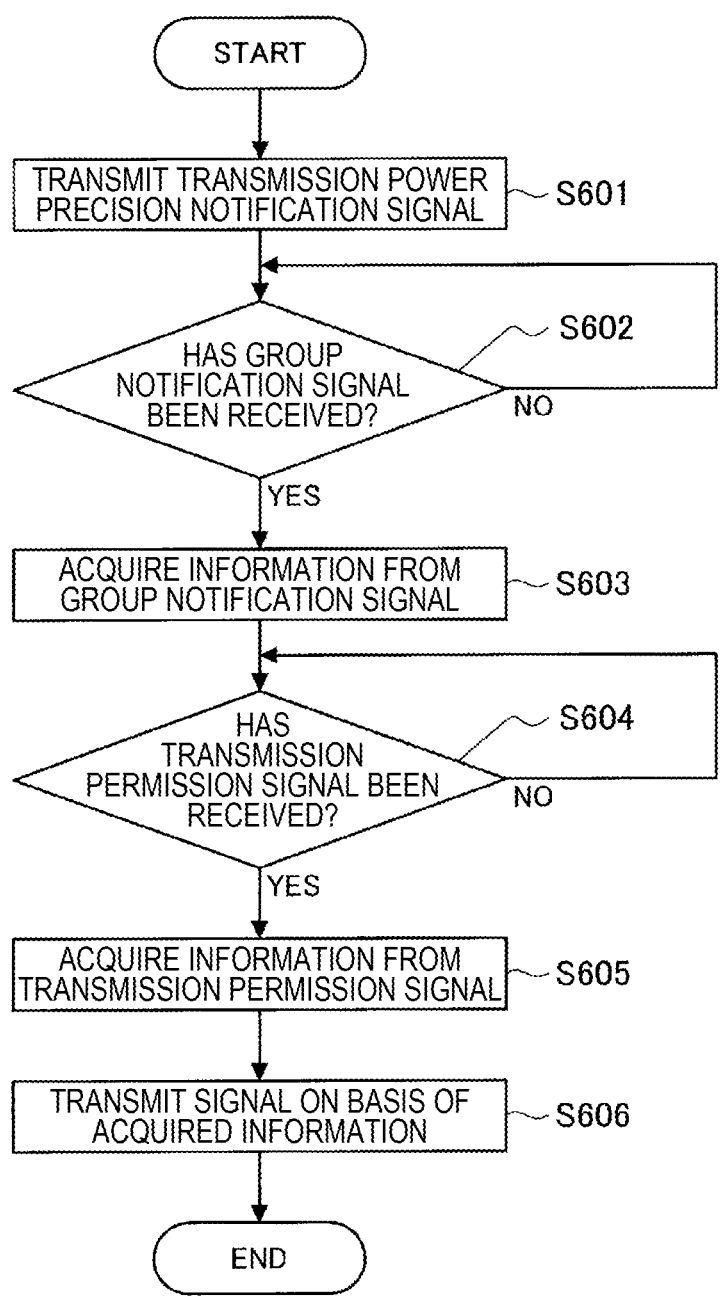
FIG. 6 is a flowchart conceptually illustrating an example of overall processing of the STA according to the embodiment.

Next, overall processing of each STA 100-1 will be described with reference to FIG. 6. FIG. 6 is a flowchart conceptually illustrating an example of overall processing of the STA 100-1 according to the embodiment.

The STA 100-1 periodically transmits a transmission power precision notification signal (Step S601). Specifically, the control unit 130 periodically causes the data processing unit 110 to generate a transmission power precision notification frame storing transmission power precision information, and the generated frame is transmitted by the wireless communication unit 120.

In addition, if a group notification signal is received (Step S602/YES), the STA 100-1 acquires information from the group notification signal (Step S603). Specifically, the data processing unit 110 acquires group assignment information stored in the received group notification frame and causes a storage unit to store the acquired group assignment information.

If a transmission permission signal is received after the reception of the group notification signal (Step S604/YES), the STA 100-1 acquires information from the transmission permission signal (Step S605). Specifically, the data processing unit 110 acquires communication parameter information from a trigger frame received by the wireless communication unit 120 in a case in which the trigger frame indicates a group to which the STA 100-1 itself belongs.

Then, the STA 100-1 transmits a signal on the basis of the acquired information (Step S606). Specifically, the control unit 130 causes the data processing unit 110 to generate a frame directed to the AP 200-1 on the basis of a transmission period and a transmission frequency indicated by the acquired communication parameter information and causes the wireless communication unit 120 to transmit the generated frame. In this manner, the frame transmitted from the STA 100-1 is multiplexed.

Note that in a case in which the STA 100-1 belongs to a single access communication group, the STA 100-1 performs single access communication. Specifically, if it is confirmed that a transmission path is vacant by performing processing such as carrier sensing after ending multiple access communication, the control unit 130 causes the data processing unit 110 to generate a frame and causes the wireless communication unit 120 to transmit the generated frame.

In addition, the STA 100-1 receives a delivery confirmation signal for the transmitted signal. Specifically, if an ACK frame for the frame transmitted by using multiple access communication or single access communication is received by the wireless communication unit 120, the control unit 130 causes the transmission of the frame using the multiple access communication or the single access communication to end.

<3.3. Summary of First Embodiment>

According to the first embodiment of the present invention, the AP 200-1 receives the first signal storing the first information with which precision or accuracy of transmission power is recognized and transmits the second signal related to permission of multiple access that allows simultaneous communication to at least one first wireless communication device identified on the basis of the first information as described above. In addition, the STA 100-1 transmits the first signal, receives the second signal after the transmission of the first signal, and controls transmission of the third signal on the basis of the second signal.

Conventionally, it is considered that the AP selects STAs capable of setting transmission power such that reception power density of the signal, which is transmitted from the STA through the multiple access communication, in the AP is within a predetermined range as members of the same group. However, since precision of the transmission power of the wireless communication devices are individually different in general, there is a concern that dispersion occurs in the reception power density even if the multiple access communication group is formed on the basis of settable transmission power. As a result, reception properties in the AP may deteriorate.

Meanwhile, according to the embodiment, it is possible to suppress a gap between the reception power density and an assumed reception power density of signals that the AP 200-1 receives from the STAs 100-1 from increasing by the multiple access communication group being formed in consideration of the transmission power precision information. Therefore, it is possible to prevent reception properties from deteriorating in a case in which a plurality of STAs 100-1 simultaneously perform communication by distortion or the like of received signals being prevented.

In addition, the aforementioned at least one first wireless communication device is identified on the basis of the first information and the threshold value for the first information. Therefore, it is possible to control precision levels related to the transmission power of the members of the formed multiple access communication group by the multiple access communication group being formed through comparison with the specific value. Therefore, it is possible to control a degree of a decrease in the reception properties permitted for the multiple access communication group. Note that the threshold value may be set in a static manner or may be dynamically changed.

In addition, the AP 200-1 transmits the aforementioned second signal to a first transmission source of the first signal storing the aforementioned first information that is equal to or greater than the aforementioned threshold value. Therefore, it is possible to reliably secure reception properties permitted for the multiple access communication group by causing the STAs 100-1 with precision that is equal to or greater than a predetermined level to perform multiple access communication.

In addition, the AP 200-1 transmits a signal indicating permission of signal connection to the first transmission source of the aforementioned first signal storing the first information that is less than the threshold value. Therefore, it is possible to explicitly indicate that the STAs 100-1 has not been selected as the members of the multiple access communication group for the STAs 100-1. Therefore, it is possible to prevent the STAs 100-1 from continuously waiting for the third signal. In addition, it is not necessary for the AP 200-1 to transmit the aforementioned second signal to the aforementioned first transmission source. In this case, it is possible to reduce the amount of communication by the STAs 100-1 recognizing assignment to the single access communication group. Therefore, it is possible to improve efficiency of the communication.

In addition, the aforementioned second signal includes a transmission permission signal indicating permission of multiple access that allows the aforementioned simultaneous communication, and the STAs 100-1 controls transmission of the aforementioned third signal on the basis of communication parameters stored in the transmission permission signal. Therefore, it is possible to prevent the signals to be communicated from increasing by the notification of the multiple access communication group in relation to the third signal being provided along with the notification of the transmission permission of the third signal. In particular, it becomes easy to apply the configuration of the AP 200-1 or the STAs 100-1 to existing wireless communication devices by an existing trigger frame being used as the transmission permission signal.

In addition, the aforementioned second signal includes a group notification signal for providing a notification of the group to which the aforementioned first wireless communication device that is permitted to perform multiple access that allows the aforementioned simultaneous communication belongs, and the STAs 100-1 controls transmission of the third signal in accordance with reception of a transmission permission signal indicating permission of multiple access that allows the aforementioned simultaneous communication, which is directed to the group in the notification provided in the group notification signal. Therefore, it is possible to separate the timing of the notification of the group from the timing of the notification of the transmission permission. Accordingly, it is possible to prevent the transmission of the third signal from being started by the notification of the group.

In addition, the multiple access that allows the aforementioned simultaneous communication includes space division multiple access. Therefore, it is possible to enhance the effect of improving efficiency of communication through the space division multiple access. In a case in which MIMO is also used on the side of the STAs 100-1, in particular, the number of communication streams increases, and therefore, the width of variations in the reception power density due to dispersion of precision of transmission power tends to increase. Therefore, the functions of the AP 200-1 and the STA 100-1 according to the embodiment are useful. Note that the multiple access that allows the aforementioned simultaneous communication may be frequency division multiple access or code division multiple access.

In addition, the aforementioned first information includes information related to an error between a setting value and an actually measured value of transmission power. Therefore, it is possible to enhance accuracy of grouping of the STAs 100-1 that perform multiple access communication. Accordingly, it is possible to suppress dispersion of reception power densities of the signals transmitted from the grouped STAs 100-1 and to effectively prevent reception properties from deteriorating.

<4. Second Embodiment>

Next, a second embodiment of the present disclosure will be described. In the second embodiment, a plurality of STAs 100-2 are divided into a plurality of groups that perform multiple access communication on the basis of transmission power precision information.

<4.1. Functions of Device>

First, the respective functions of the STAs 100-2 and an AP 200-2 that are wireless communication devices according to the embodiment will be described. Note that description of functions that are substantially the same as the functions in the first embodiment will be omitted.

(Formation of Group)

The AP 200-2 decides a plurality of groups of the STAs 100-2 that perform multiple access communication on the basis of transmission power precision information. Specifically, the control unit 230 decides the STAs 100-2 with transmission power precision information that is equal to or greater than a threshold value as members of a first multiple access communication group and decides the STAs 100-2 with transmission power precision information that is less than the threshold value as members of a second multiple access communication group. For example, the control unit 230 decides the STAs 100-2 with numerical values of errors related to precision of transmission power that are less than a threshold value, with error grades that are less than a threshold value, or with evaluation values related to errors that are equal to or greater than a threshold value as members of the first multiple access communication group. In addition, the control unit 230 decides the STAs 100-2 with numerical values of errors related to precision of transmission power that are equal to or greater than the threshold value, with error grades that are equal to or greater than the threshold value, or with evaluation values related to errors that are less than the threshold value as members of the second multiple access communication group.

(Notification of Group)

The AP 200-2 transmits group notification signals for providing notifications of the multiple access communication groups directed to the members of the plurality of decided multiple access communication groups. Specifically, the control unit 230 causes the data processing unit 210 to generate group notification frames that provide notifications of members of the first multiple access communication group and members of the second multiple access communication group, and the generated group notification frames are transmitted by the wireless communication unit 220. For example, the control unit 230 causes the data processing unit 210 to generate group notification frames for providing notifications of the multiple access communication groups directed to the STAs 100-2 decided as the members of the first multiple access communication groups and the STAs 100-2 decided as the members of the second multiple access communication group. Then, the generated group notification frames are transmitted by the wireless communication unit 220. Note that the notifications of the plurality of multiple access communication groups may be individually performed. Also, the plurality of multiple access communication groups may be three or more groups.

(Notification of Transmission Permission)

The AP 200-2 transmits the respective transmission permission signals to the plurality of multiple access communication groups. Specifically, the control unit 230 controls transmission of first transmission permission signals to the first multiple access communication group and controls transmission of second transmission permission signals to the second multiple access communication groups. For example, the control unit 230 causes the data processing unit 210 to generate first trigger frames directed to the members of the first multiple access communication group, and the generated first trigger frames are transmitted by the wireless communication unit 220. Thereafter, if the multiple access communication and communication of ACK frames are completed, the control unit 230 causes the data processing unit 210 to generate second trigger frames directed to the members of the second multiple access communication group, and the generated second trigger frame is transmitted by the wireless communication unit 220.

Note that first communication parameter information stored in the first transmission permission signals may be different from second communication parameter information stored in the second transmission permission signals. Specifically, communication parameter information related to noise resistance in communication stored in the first trigger frames is different from the communication parameter information stored in the second trigger frames. The communication parameters include a modulation scheme, a coding scheme, or MCS. For example, MCS information with higher communication reliability (redundancy and the like) than that of MCS information stored in the first trigger frames is stored in the second trigger frames transmitted to the members of the second multiple access communication group with precision of transmission power that is lower than precision of transmission power for the first multiple access communication group. This is because reception properties of the signals transmitted from the members of the second multiple access communication group are considered to be relatively degraded since precision of transmission power for the second multiple access communication group is lower than precision for the first multiple access communication group.

<4.2. Flow of Processing>

Figure 7:
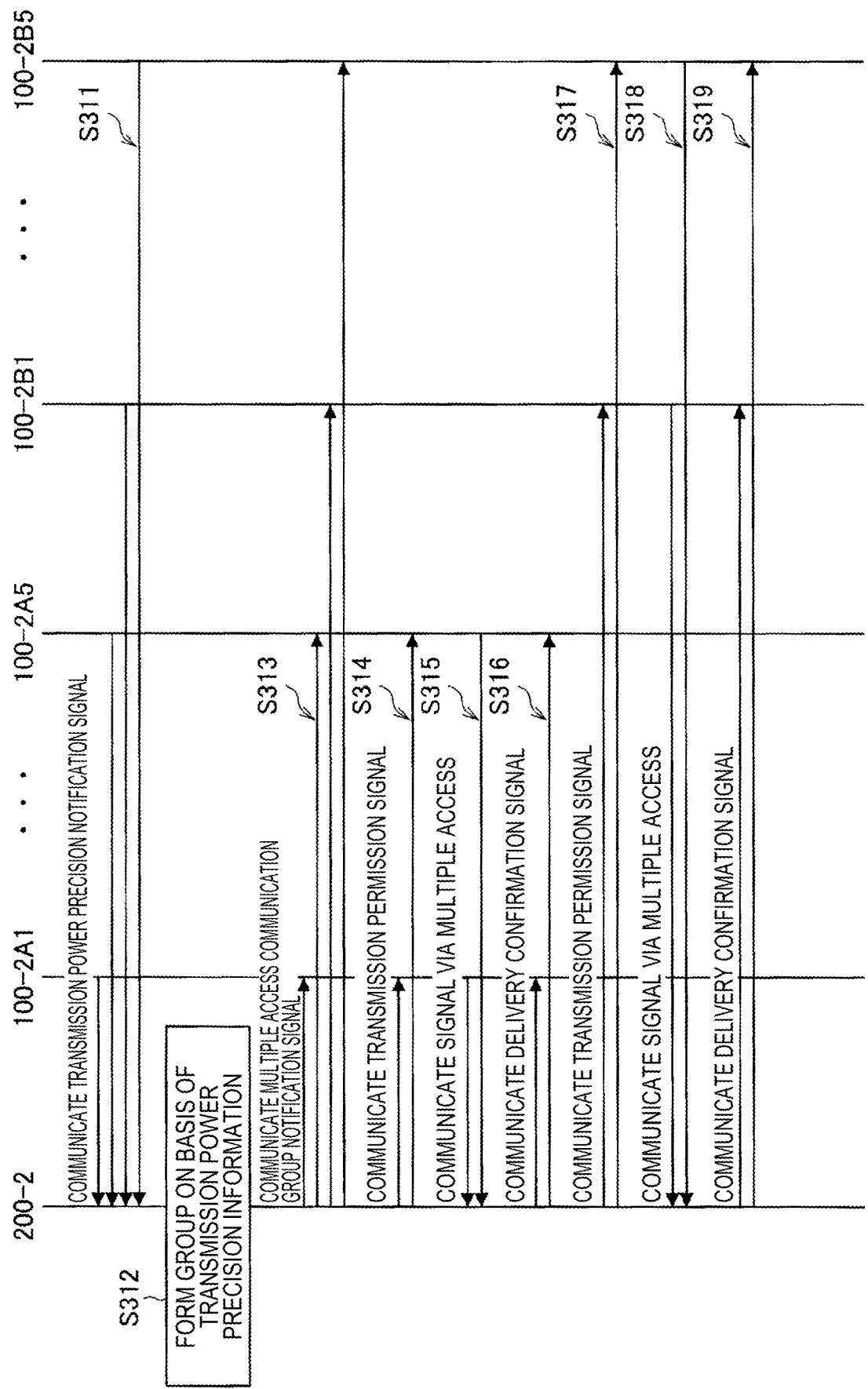
FIG. 7 is a sequence diagram conceptually illustrating an example of processing of the wireless communication system according to the embodiment.

Next, a flow of processing of the wireless communication system according to the embodiment will be described with reference to FIG. 7. FIG. 7 is a sequence diagram conceptually illustrating an example of the processing of the wireless communication system according to the embodiment.

STAs 100-2A1 to 100-2A5 and STAs 100-2B1 to 100-2B5 transmit transmission power precision notification signals to the AP 200-2 (Step S311). The AP 200-2 that has received the transmission power precision notification signals form a plurality of multiple access communication groups on the basis of transmission power precision information (Step S312). Next, the AP 200-2 transmits multiple access communication group notification signals to the STAs 100-2A1 to 100-2A5 that are the members of the first multiple access communication group and the STAs 100-2B1 to 100-2B5 that are the members of the second multiple access communication group (Step S313).

Next, the AP 200-2 transmits transmission permission signals to the STAs 100-2A1 to 100-2A5 that are the members of the first multiple access communication group (Step S314). The STAs 100-2A1 to 100-2A5 that have received the transmission permission signals transmit signals to the AP 200-2 (Step S315). Note that frames transmitted from the STAs 100-2A1 to 100-2A5 are subjected to frequency division multiplexing, space division multiplexing, or code division multiplexing. The AP 200-2 that has received the multiplexed signals transmits delivery confirmation signals to the respective STAs 100-2A1 to 100-2A5 that are transmission sources of the received signals (Step S316).

After the first multiple access communication ends, the AP 200-2 transmits transmission permission signals to the STAs 100-2B1 to 100-2B5 that are the members of the second multiple access communication group (Step S317). The STAs 100-2B1 to 100-2B5 that have received the transmission permission signals transmit signals to the AP 200-2 (Step S318). The AP 200-2 that has received the multiplexed signals transmits delivery confirmation signals to the respective STAs 100-2B1 to 100-2B5 that are transmission sources of the received signals (Step S319).

Next, processing of the STAs 100-2 and the AP 200-2 according to the embodiment will be individually described. Note that description of processing that is substantially the same as the processing in the first embodiment will be omitted.

(Processing of AP)

Figure 8:
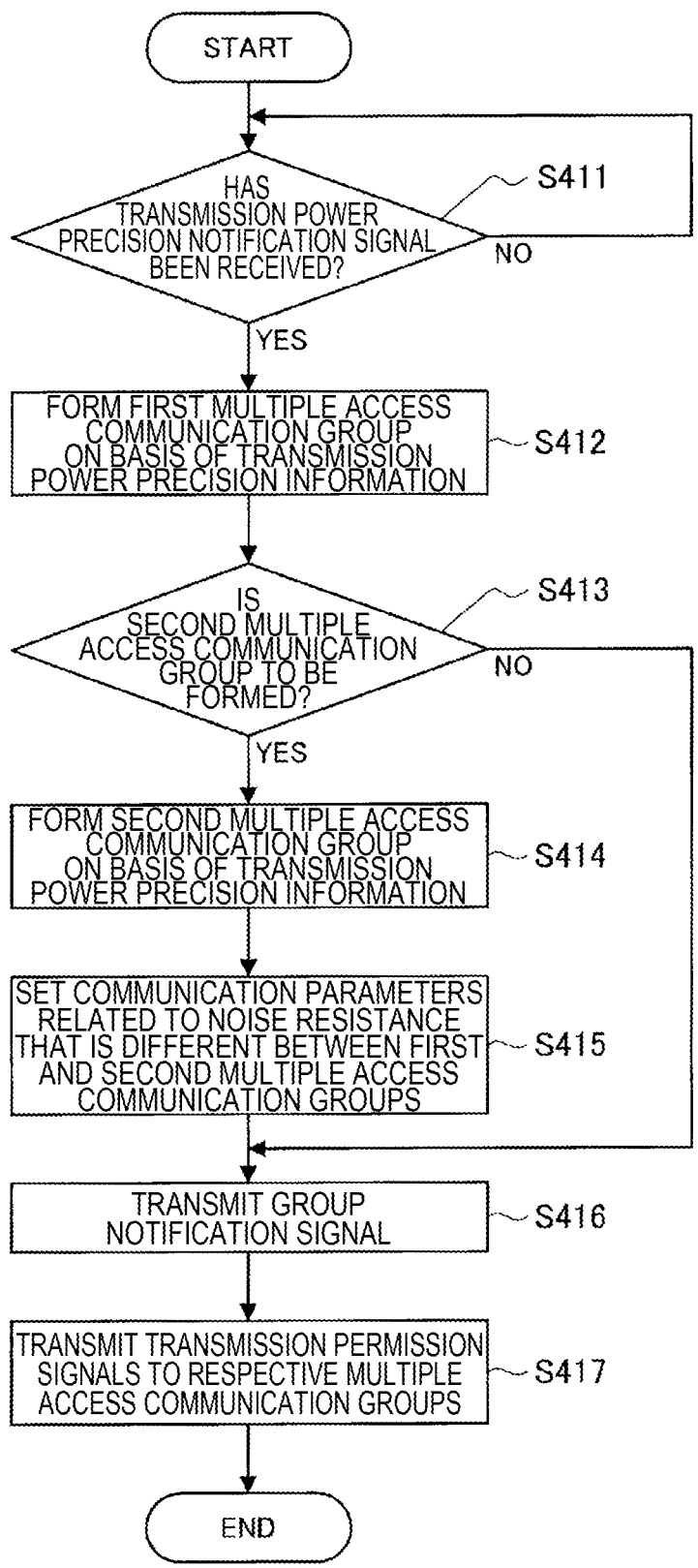
FIG. 8 is a flowchart conceptually illustrating an example of overall processing of the AP according to the embodiment.

First, overall processing of the AP 200-2 will be described with reference to FIG. 8. FIG. 8 is a flowchart conceptually illustrating an example of overall processing of the AP 200-2 according to the embodiment.

If it is determined that the transmission power precision notification signals have been received (Step S411/YES), the AP 200-2 forms first multiple access communication groups on the basis of the transmission power precision information (Step S412). Specifically, the control unit 230 forms the first multiple access communication groups on the basis of the transmission power precision information stored in received transmission power precision notification frames and a threshold value.

In addition, if it is determined that the second multiple access communication groups have been formed (Step S413/YES), the AP 200-2 forms second multiple access communication groups on the basis of the transmission power precision information (Step S414). Specifically, the control unit 230 forms the second multiple access communication groups on the basis of the transmission power precision information stored in received transmission power precision notification frames and a threshold value.

Next, the AP 200-2 sets communication parameters related to noise resistance that is different between the first and second multiple access communication groups (Step S415). Specifically, the control unit 230 sets, for the second multiple access communication group, a second communication parameter with higher reliability than that of a first communication parameter, such as MCS, which is set for the first multiple access communication group.

Next, the AP 200-2 transmits group notification signals (Step S416). Specifically, the control unit 230 causes the data processing unit 210 to generate multiple access communication group notification frames for providing formed notifications of the first and second multiple access notification groups, and the generated frames are transmitted by the wireless communication unit 220.

Thereafter, the AP 200-2 transmits transmission permission signals to the respective multiple access communication groups (Step S417). Specifically, the control unit 230 causes the data processing unit 210 and the wireless communication unit 220 to transmit first trigger frames storing the set first communication parameter information directed to the members of the first multiple access communication group. Thereafter, the control unit 230 causes the data processing unit 210 and the wireless communication unit 220 to transmit second trigger frames storing second communication parameter information directed to the members of the second multiple access communication group.

<4.3. Summary of Second Embodiment>

According to the second embodiment of the present disclosure, the AP 200-1 transmits the second signals to second transmission sources of the first signals storing the first information that is less than the threshold value, and the communication parameter that is different from the communication parameter stored in the second signals transmitted to the first transmission source is stored in the second signal transmitted to the second transmission source. Therefore, it is possible to improve efficiency of communication by the STAs 100-2 with precision of transmission power that is less than the threshold value also performing the multiple access communication. Meanwhile, there is a concern that reception properties for the signals transmitted from the STAs 100-2 with precision of transmission power that is less than the threshold value may be further degraded than reception properties for signals transmitted from the STAs 100-2 with precision of transmission power that is higher than the threshold value. Thus, it is also possible to maintain a signal reception success rate for the group with a concern that the reception properties may relatively deteriorate, by changing communication parameters used in the multiple access communication for the groups with different precision o transmission power.

In addition, the aforementioned communication parameters include communication parameters related to noise resistance in communication. Therefore, it is possible to effectively prevent the groups with the concern that the reception properties may relatively deteriorate from failing to receive signals.

<5. Third Embodiment>

Next, a third embodiment of the present disclosure will be described. In the third embodiment, a multiple access communication group is reformed in accordance with a change in situations.

<5.1. Functions of Device>

First, the respective functions of the STAs 100-3 and an AP 200-3 that are wireless communication devices according to the embodiment will be described. Note that description of functions that are substantially the same as the functions in the first or second embodiment will be omitted.

(Detection of Change in Connection for Communication)

An AP 200-3 detects a change in connection for communication with STAs 100-3. Specifically, a control unit 230 detects release of connection for communication with the STAs 100-3 or a start of the connection for the communication. For example, the control unit 230 detects the release of the connection or the start of the connection on the basis of connection release signals (fourth signals) or connection start signals (fourth signals) received from the STAs 100-3.

Each STA 100-3 notifies the AP 200-3 of release of connection via communication. Specifically, a control unit 130 notifies the AP 200-3 of release of connection via communication in a case in which the connection for communication between the STA 100-3 itself and the AP 200-3 is released. In a case in which the connection for communication is released normally for example, the control unit 130 causes a data processing unit 110 to generate a connection release signal, and the generated connection release signal is transmitted by a wireless communication unit 120. Note that in a case in which the connection for communication is unintentionally disconnected, the connection release signal may not be transmitted. Also, the connection start signal may be a dedicated signal or may be an existing signal related to release of connection for communication, such as a disassociation frame or a deauthentication frame. Also, the release of connection may be temporarily performed. For example, the connection release signal may be transmitted in accordance with temporal release of connection for power saving.

In addition, the STA 100-3 notifies the AP 200-3 of the start of connection via communication. Specifically, the control unit 130 notifies the AP 200-3 of the start of connection via communication in a case in which connection for communication with the AP 200-3 is newly started. For example, the control unit 130 causes the data processing unit 110 to generate a connection start signal, and the generated connection start signal is transmitted by the wireless communication unit 120. Note that the connection start signal may be a dedicated signal and may be an existing signal related to the start of connection for communication, such as a probe request frame, an association request frame, or an authentication frame. In addition, the start of connection may be recovered from temporal release of connection. For example, the connection start signal may be transmitted in response to recovery from temporal release of connection for power saving.

(Detection of Change in Transmission Power Precision Information)

The AP 200-3 detects a change in transmission power precision information. Specifically, the control unit 230 detects a change in the transmission power precision information on the basis of a notification of a change in the transmission power precision information or a notification of the transmission power information. For example, the control unit 230 detects a change in the transmission power precision information on the basis of transmission power precision information change signals (fourth signals) received from the STAs 100-3. Also, the control unit 230 detects a change in the transmission power precision information on the basis of the signals (fourth signals) storing the transmission power information received from the STAs 100-3, and reception power densities and delivery losses of the signals.

Each STA 100-3 notifies the AP 200-3 of the change in the transmission power precision information. Specifically, the control unit 130 notifies the AP 200-3 of transmission power precision information after the change via communication in a case in which precision of transmission power has changed. In a case in which precision of transmission power has changed in response to an instruction from a higher communication layer or transition of a state of the STA 100-3 to a power saving mode, for example, the control unit 130 changes the transmission power precision information. Then, the control unit 130 causes the data processing unit 110 to generate a change signal storing the transmission power precision information after the change, and the generated change signal is transmitted by the wireless communication unit 120. Note that the precision of transmission power may be switched in accordance with a mode, and the mode may be a mode dedicated for the precision of transmission power or may be a mode that is used for another purpose.

In addition, the control unit 130 notifies the AP 200-3 of transmission power information in a case in which precision of transmission power has changed. Specifically, if the precision of transmission power has changed, the control unit 130 causes the data processing unit 110 to generate a signal storing transmission power information set in the STA 100-3. Then, the control unit 130 causes the wireless communication unit 120 to transmit the generated signal with transmission power indicated by transmission power information stored in the signal. For example, the signal storing the transmission power information may be a data frame or may be a signal for another purpose, such as a management frame.

(Reformation of Group)

The AP 200-3 reforms a multiple access communication group on the basis of detection of a change in connection for communication. Specifically, if the release of connection is detected, the control unit 230 excludes the STAs 100-3, connection with which is to be released, from the set multiple access communication group. In a case in which an STA 100-3 that is a transmission source of a connection release signal is a member of the multiple access communication group, for example, the control unit 230 excludes the STA 100-3 from the multiple access communication group. Note that the control unit 230 may add another STA 100-3 that has already been connected for communication to the multiple access communication group when the STA 100-3, the connection of which is to be released, is excluded from the multiple access communication group.

In addition, if the start of connection is detected, the control unit 230 determines whether to add the STA 100-3, connection of which is to be started, to the set multiple access communication group on the basis of the transmission power precision information of the STA 100-3. If it is determined that the STA 100-3 is to be added, the control unit 230 adds the STA 100-3, connection with which is to be started, to the multiple access communication group. In a case in which an error value indicated by the transmission power precision information of the STA 100-3 that is a transmission source of a connection start signal is less than a threshold value, the control unit 230 adds the STA 100-3 to the multiple access communication group. Note that the control unit 230 may exclude any of existing members of the multiple access communication group when a member is added to the multiple access communication group.

In addition, the AP 200-2 reforms the multiple access communication group on the basis of detection of a change in the transmission power precision information. Specifically, if a change in the transmission power precision information is detected, the control unit 230 determines to exclude the STA 100-3 from the multiple access communication group on the basis of the transmission power precision information after the change. In a case in which the STA 100-3 that is a transmission source of a transmission power precision information change signal is a member of the multiple access communication group, for example, the control unit 230 determines whether or not to exclude the STA 100-3 from the multiple access communication group on the basis of the transmission power precision information after the change. If it is determined that the STA 100-3 is to be excluded since the error value indicated by the transmission power precision information is equal to or greater than a threshold value, the control unit 230 excludes the STA 100-3 from the multiple access communication group. Note that the transmission power precision information after the change may be stored in the aforementioned change signal or may be provided as a notification by using another signal.

In addition, if a change in the transmission power precision information is detected, the control unit 230 determines whether to add the STA 100-3 to the multiple access communication group on the basis of the transmission power precision information after the change. In a case in which the STA 100-3 that is the transmission source of the transmission power precision information change signal is not the member of the multiple access communication group, the control unit 230 determines whether to add the STA 100-3 to the multiple access communication group on the basis of the transmission power precision information after the change. If it is determined that the STA 100-3 is to be added since the error value indicated by the transmission power precision information is less than a threshold value, the control unit 230 adds the STA 100-3 to the multiple access communication group.

<5.2. Flow of Processing>

Figure 9:
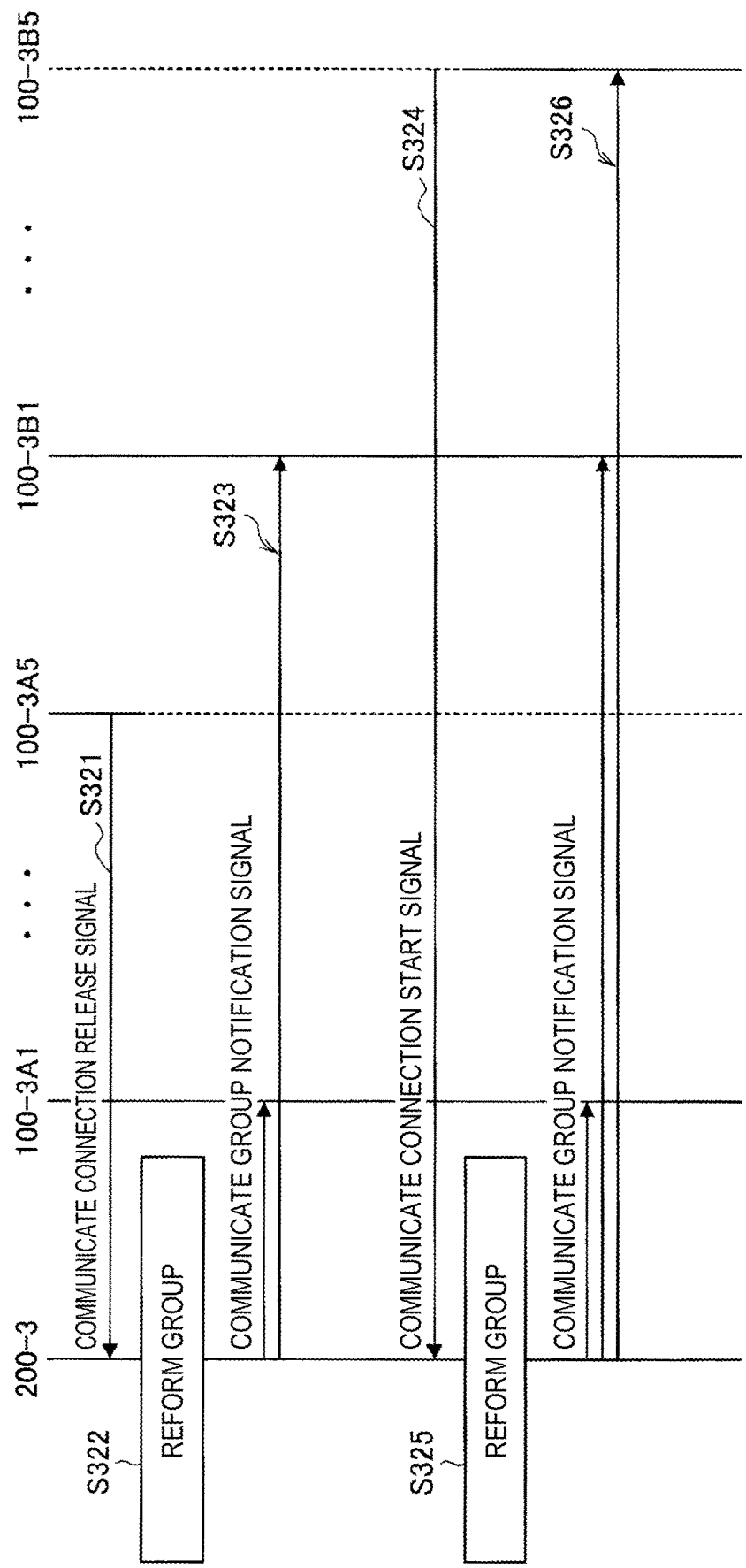
FIG. 9 is a sequence diagram conceptually illustrating an example of group reformation processing based on a change in connection for communication of the wireless communication system according to the embodiment.

Next, a flow of group reformation processing of the wireless communication system according to the embodiment will be described. First, group reformation processing based on a change in connection for communication will be described with reference to FIG. 9. FIG. 9 is a sequence diagram conceptually illustrating an example of the group reformation processing based on a change in connection for communication in the wireless communication system according to the embodiment. Note that the processing which will be described below may be performed after the multiple access communication group is once formed.

The STA 100-3A5 transmits a connection release signal (Step S321). The AP 200-3 that has received the connection release signal reforms a group (Step S322). Then, the AP 200-3 transmits group notification signals for the reformed group to members of the group except for the STA 100-3A5, connection with which has been released (Step S323).

In addition, the STA 100-3B5 transmits a connection start signal (Step S324). The AP 200-3 that has received the connection start signal reforms a group (Step S325). Then, the AP 200-3 transmits group notification signals for the reformed group to the members of the group including the STA 100-3B5, the connection with which has been started (Step S326).

Figure 10:
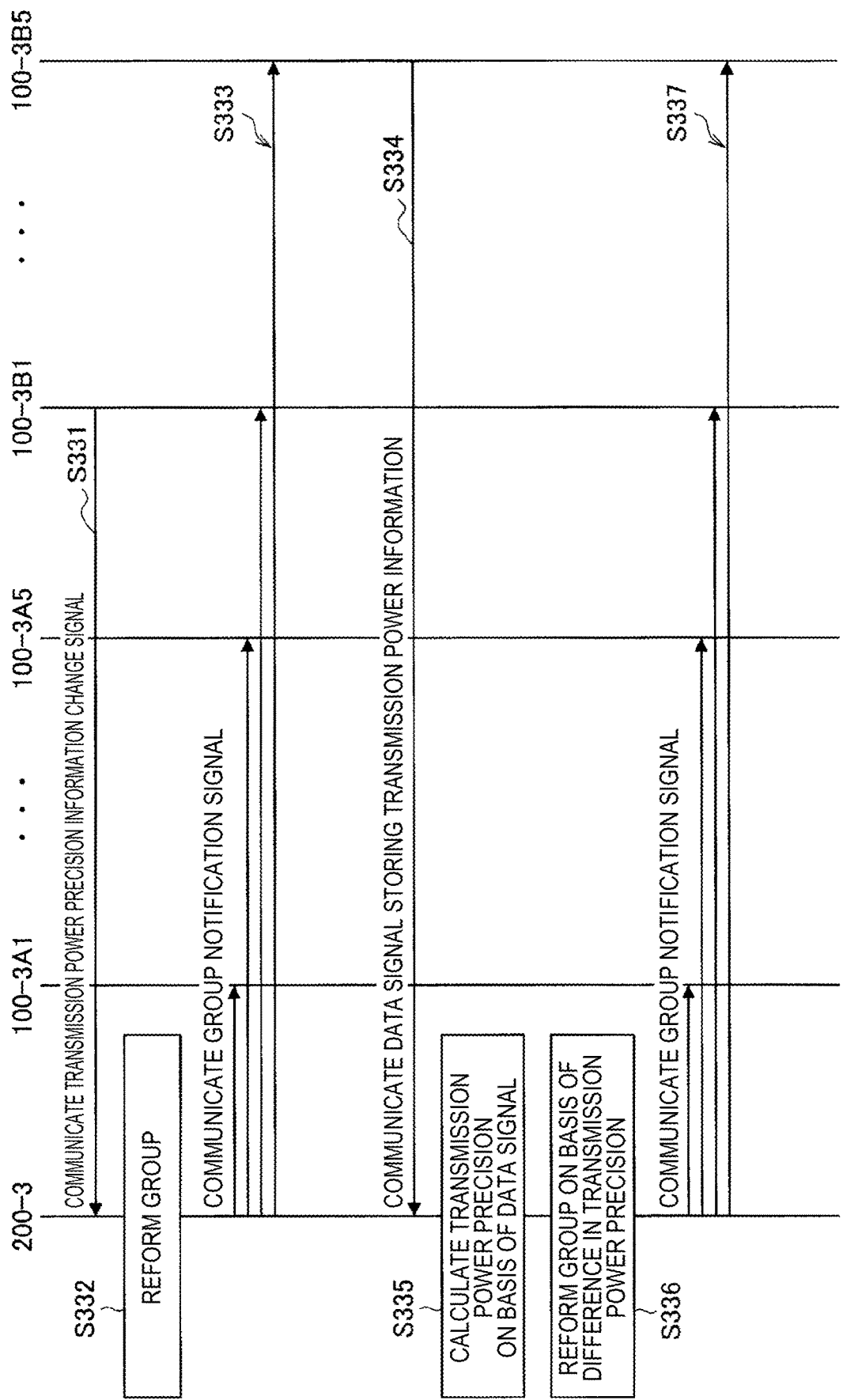
FIG. 10 is a sequence diagram conceptually illustrating an example of group reformation processing based on a change in transmission power precision information of the wireless communication system according to the embodiment.

Also, group reformation processing based on a change in transmission power precision information will be described with reference to FIG. 10. FIG. 10 is a sequence diagram conceptually illustrating an example of group reformation processing based on a change in transmission power precision information of the wireless communication system according to the embodiment.

The STA 100-3B1 transmits a transmission power precision information (Step S331). The AP 200- that has received the change signal reforms a group on the basis of the transmission power precision information after the change (Step S332). The, the AP 200-3 transmits group notification signals for the reformed group to the STAs 100-3A1 to 100-3B5 that are the members of the group (Step S333).

In addition, if the transmission power precision information changes, the STA 100-3B5 transmits a data signal storing transmission power information (Step S334). The AP 200-3 that has received the data signal calculates transmission power precision on the basis of the data signal (Step S335). Next, the AP 200-3 reforms the group on the basis of a difference in the transmission power precision (Step S336). Then, the AP 200-3 transmits group notification signals for the reformed group to the STAs 100-3A1 to 1003B5 that are the members of the group (Step S337).

Next, processing of the STAs 100-3 and the AP 200-3 according to the embodiment will be individually described.

Note that description of processing that is substantially the same as the processing in the first or second embodiment will be omitted.

(Processing of AP)

Figure 11:
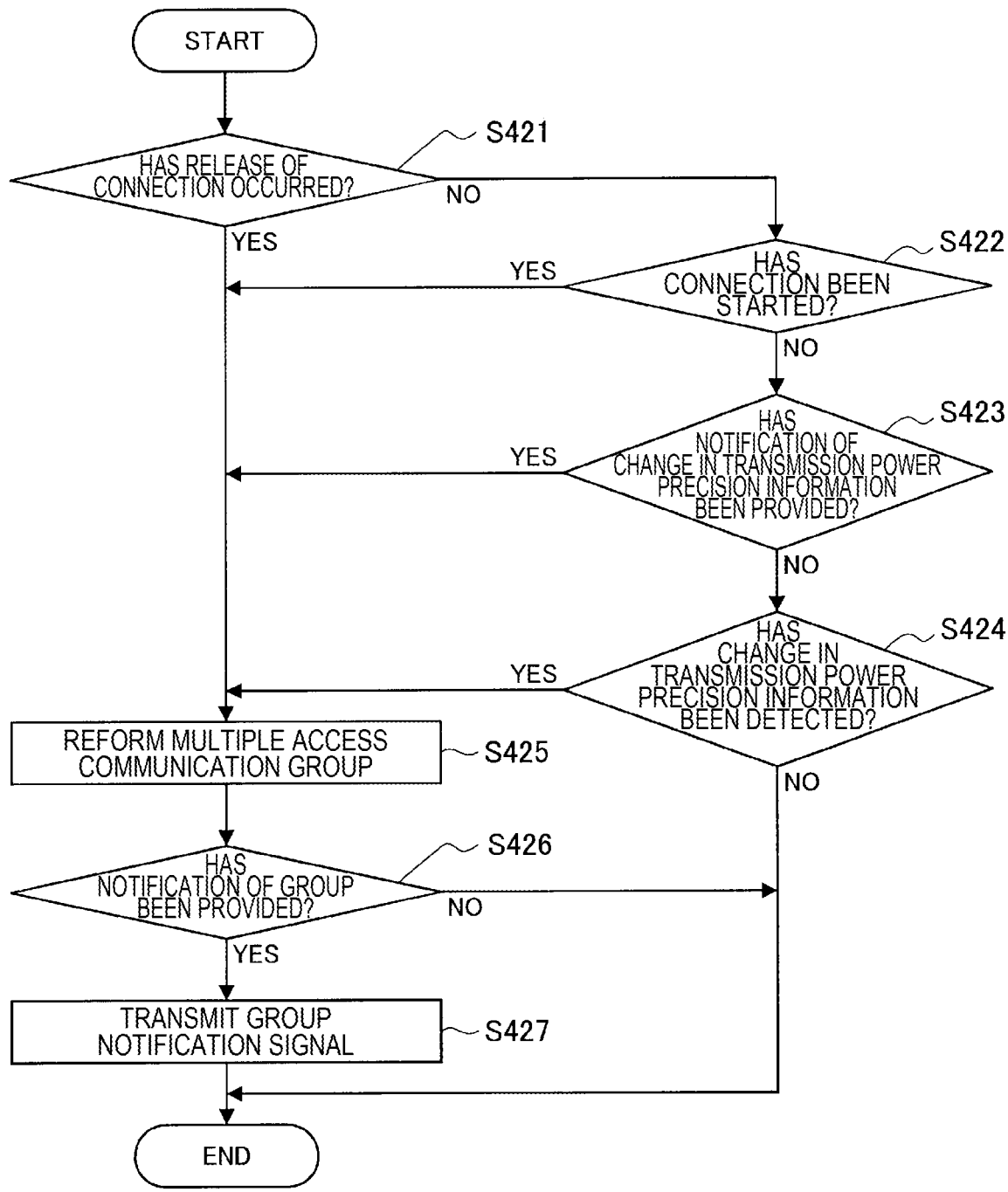
FIG. 11 is a flowchart conceptually illustrating an example of overall processing of the AP according to the embodiment.

First, overall processing of the AP 200-3 will be described with reference to FIG. 11. FIG. 11 is a flowchart conceptually illustrating an example of overall processing of the AP 200-3 according to the embodiment.

If it is determined that release of connection has occurred (Step S421/YES), the AP 200-3 reforms the multiple access communication group (Step S425). Specifically, if a connection release signal is received, the control unit 230 excludes the STA 100-3 that is a transmission source of the connection release signal from the multiple access communication group.

In addition, if it is determined that a start of connection has occurred (Step S422/YES), the AP 200-3 reforms the multiple access communication group (Step S425). Specifically, if a connection start signal is received, the control unit 230 adds the STA 100-3 to the multiple access communication group on the basis of transmission power precision information of the STA 100-3 that is a transmission source of the connection start signal. Note that the transmission power precision information may be stored in the connection start signal or may be provided as a notification by using another signal. In addition, in a case in which the STA 100-3 has been connected to the AP 200-3 in the past, transmission power precision information provided as a notification in the past may be used.

In addition, if it is determined that the notification of the change in the transmission power precision information has been provided (Step S423/YES), the AP 200-3 reforms the multiple access communication group (Step S425). Specifically, if a transmission power precision information change signal is received, the control unit 230 registers transmission power precision information after the change that is stored in the change signal. Then, the control unit 230 adds or excludes the transmission source of the change signal to or from the multiple access communication group on the basis of the transmission power precision information after the change.

In addition, if it is determined that a change in transmission power precision information has been detected (Step S424), the AP 200-3 reforms the multiple access communication group (Step S425). Specifically, if a data signal storing the transmission power information is received, the control unit 230 estimates transmission power of the data signal from the reception power density and the transmission loss. Next, the control unit 230 calculates a difference between the estimated transmission power and the transmission power indicated by the transmission power information stored in the data signal. In addition, in a case in which an error indicated by the registered transmission power precision information is different from the calculated difference, the control unit 230 registers the calculated difference as the transmission power precision information after the change and performs addition or exclusion to or from the members of the multiple access communication group on the basis of the calculated difference. Note that the registered transmission power precision information may be information calculated on the basis of the signal received in the past.

Then, if it is determined that a notification of the group is to be provided (Step S426/YES), the AP 200-3 transmits a group notification signal (Step S427). Note that the group notification signal may store communication parameter information. In addition, the communication parameter information may be updated in accordance with the multiple access communication group after the reformation.

(Processing of STA)

Figure 12:
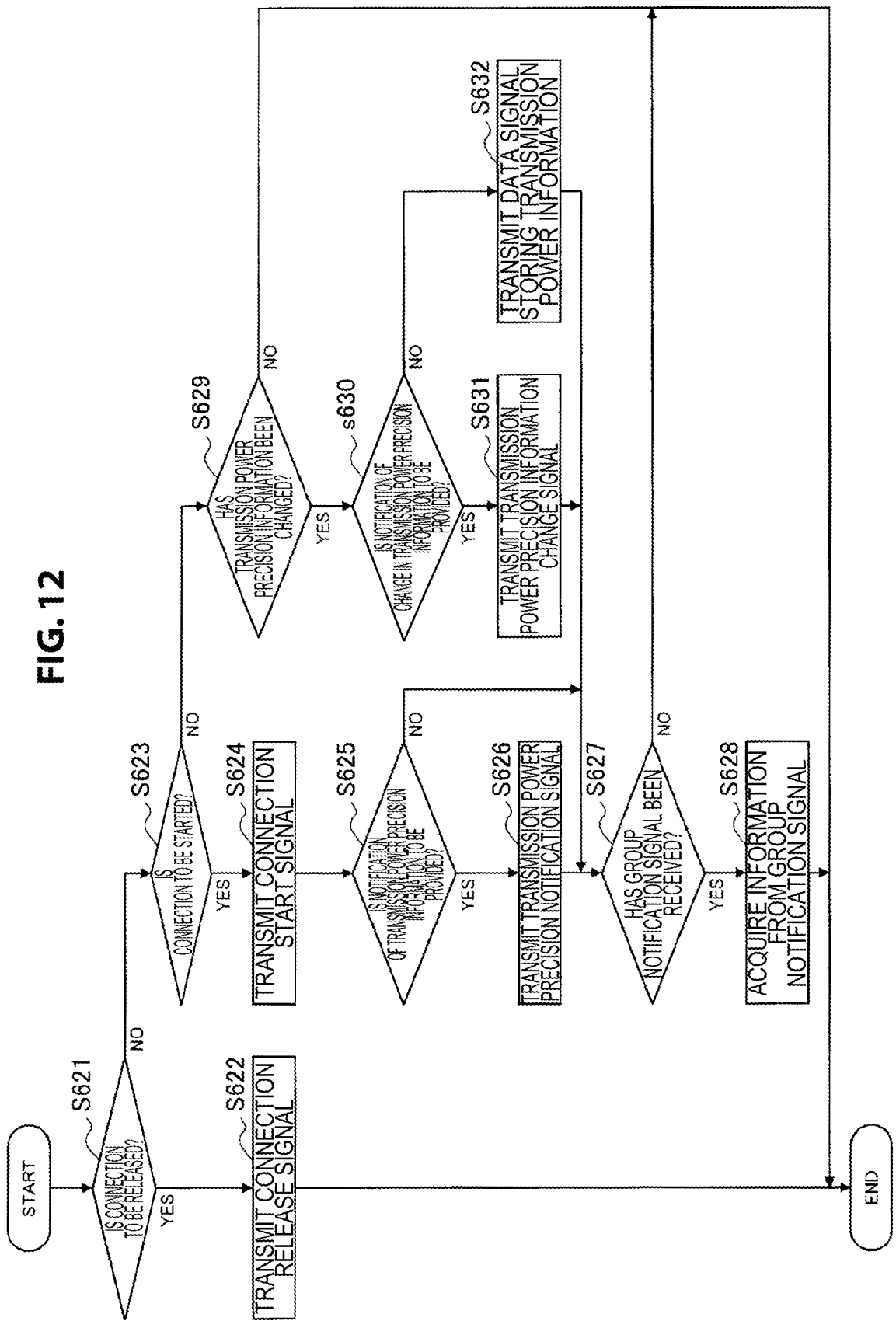
FIG. 12 is a flowchart conceptually illustrating an example of overall processing of the STA according to the embodiment.

Next, overall processing of each STA 100-3 will be described with reference to FIG. 12. FIG. 12 is a flowchart conceptually illustrating an example of overall processing of the STA 100-3 according to the embodiment.

If it is determined that connection for communication with the AP 200-3 is to be released (Step S621/YES), the STA 100-3 transmits a connection release signal to the AP 200-3 (Step S622).

In addition, if it is determined that the connection for communication with the AP 200-3 is to be started (Step S623/YES), the STA 100-3 transmits a connection start signal to the AP 200-3 (Step S623). Next, if it is determined that notification of transmission power precision information is to be provided (Step S625/YES), the STA 100-3 transmits a transmission power precision notification signal to the AP 200-3 (Step S626). Note that in a case in which a notification of transmission power precision information has been provided in the past, the transmission power precision notification signal may not be transmitted.

In addition, if it is determined that transmission power precision information has been changed (Step S629/YES), and it is determined that a notification of a change in the transmission power precision information is to be provided (Step S630/YES), the STA 100-3 transmits a transmission power precision information change signal (Step S631). Meanwhile, if it is determined that the notification of the change in the transmission power precision information is not to be provided (Step S630/NO), the STA 100-3 transmits a data signal storing transmission power information (Step S632).

Thereafter, if a group notification signal is received (Step S627/YES), the STA 100-3 acquires information from the group notification signal (Step S628).

<5.3. Summary of Third Embodiment>

According to the third embodiment of the present disclosure, the AP 200-3 controls destinations of the second signals on the basis of a change in the connection for communication with the STAs 100-3. In addition, the STAs 100-3 transmit fourth signals for providing a notification of a change in the connection for communication with the AP 200-3. Therefore, in a case in which an increase or a decrease in the members of the formed multiple access communication group has occurred, it is possible to optimize the number of members in the multiple access communication group by the multiple access communication group being reformed. Therefore, it is possible to improve efficiency of communication.

In addition, the AP 200-3 controls destinations of second signals on the basis of a change in the transmission power precision information. Also, the STAs 100-3 transmit fourth signals for providing notifications of the change in the transmission power precision information. Therefore, it is possible to optimize the reception power densities of the signals transmitted from the members of the multiple access communication group by the multiple access communication group being reformed in accordance with the change in the precision of transmission power. Therefore, it is possible to prevent reception properties from deteriorating due to the change in the precision of transmission power.

<6. Fourth Embodiment>

Next, a fourth embodiment of the present disclosure will be described. In the fourth embodiment, transmission power precision information is shared among and updated in a plurality of APs 200-4.

<6.1. Functions of Device>

First, the respective functions of the STAs 100-4 and an AP 200-4 that are wireless communication devices according to the embodiment will be described. Note that description of functions that are substantially the same as the functions in the first embodiment will be omitted.

(Accumulation of Difference in Transmission Power Precision Information)

Each AP 200-4 accumulates a difference between the transmission power provided as a notification and calculated transmission power. Specifically, the control unit 230 calculates a difference between transmission power indicated by the transmission power information stored in data signals received from the STAs 100-4 and transmission power estimated from reception power densities and delivery losses of the data signals. Then, the control unit 230 causes the storage unit to store difference information related to the calculated difference.

(Sharing of Difference in Transmission Power Precision Information)

Each AP 200-4 shares the accumulated difference with the other APs 200-4. Specifically, the control unit 230 causes the data processing unit 210 to generate a difference notification signal in which a predetermined amount of accumulated difference information is stored or the accumulated difference information is periodically stored. Then, the generated difference notification signal is transmitted by the wireless communication unit 220. In addition, if the difference notification signal is received from another AP 200-4, the control unit 230 causes the storage unit to store the difference information stored in the difference notification signal. Note that transmission power precision information may be shared along with the difference information.

(Updating Transmission Power Precision Information)

Each AP 200-4 updates the transmission power precision information on the basis of the accumulated difference information. Specifically, if the predetermined amount of difference information is accumulated, the control unit 230 acquires statistical values related to transmission power precision by executing statistical processing on the difference information and the transmission power precision information. Then, the control unit 230 uses the acquired statistical values for group formation processing and the like as transmission power precision information.

<6.2. Flow of Processing>

Figure 13:
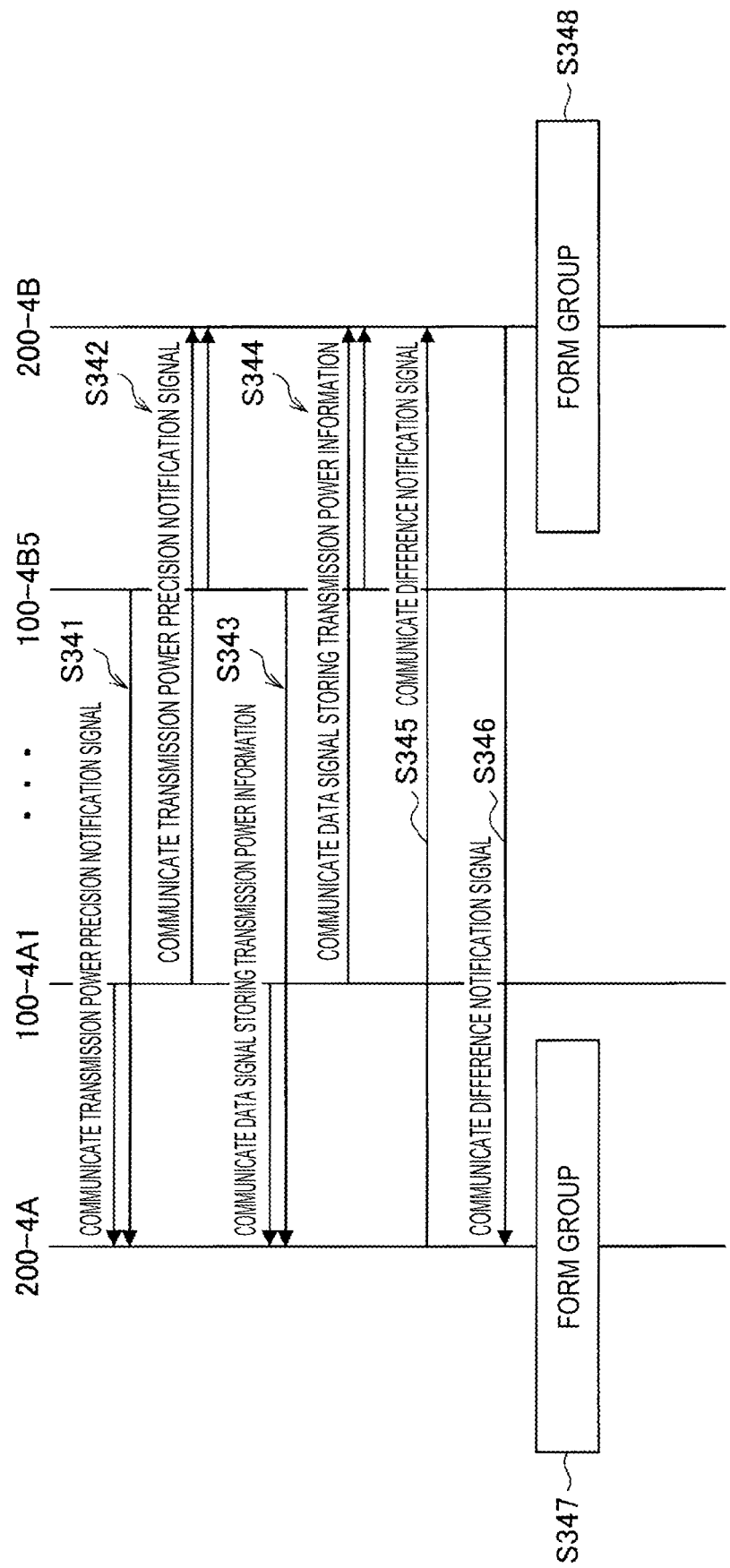
FIG. 13 is a sequence diagram conceptually illustrating difference information sharing processing and transmission power precision information updating processing of the wireless communication system according to the embodiment.

Next, flows of difference information sharing processing and transmission power precision information updating processing in the wireless communication system according to the embodiment will be described with reference to FIG. 13. FIG. 13 is a sequence diagram conceptually illustrating examples of difference information sharing processing and transmission power precision information updating processing in the wireless communication system according to the embodiment.

STAs 100-4A1 to 100-4B5 transmit transmission power precision notification signals to the AP 200-4A (Step S341). Similarly, the STAs 100-4A1 to 100-4B5 transmit the transmission power precision notification signals to the AP 200-4B (Step S342). Next, the STAs 100-4A1 to 100-4B5 transmit data signals storing transmission power information to the AP 200-4A (Step S343). Similarly, the STAs 100-4A1 to 100-4B5 transmit data signals storing transmission power information to the AP 200-4B (Step S344).

The AP 200-4A transmits a difference notification signal storing accumulated difference information to the AP 200-4B (Step S345). Similarly, the AP 200-4B transmits a difference notification signal storing accumulated difference information to the AP 200-4A (Step S346). Then, the AP 200-4A that has received the difference notification signal forms a group by using transmission power precision information updated on the basis of the shared difference information and the accumulated difference information (Step S347). Similarly, the AP 200-4B that has received the difference notification signal forms a group by using transmission power precision information updated on the basis of the shared difference information and the accumulated difference information (Step S348).

Next, processing of the STAs 100-4 and the AP 200-4 according to the embodiment will be individually described. Note that description of processing that is substantially the same as the processing in the first to third embodiments will be omitted.

(Processing of AP)

Figure 14:
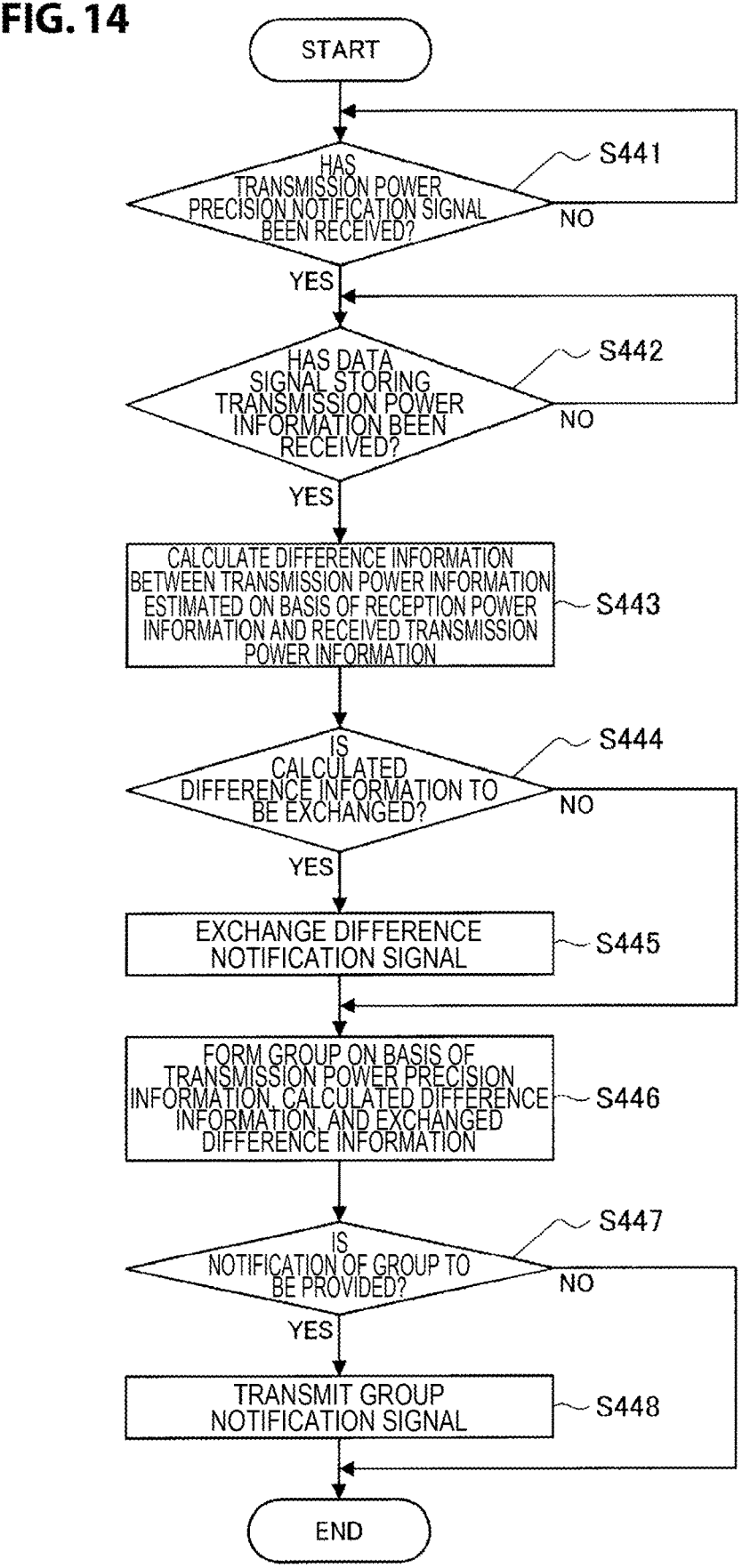
FIG. 14 is a flowchart conceptually illustrating an example of overall processing of the AP according to the embodiment.

First, overall processing of the AP 200-4 will be described with reference to FIG. 14. FIG. 14 is a flowchart conceptually illustrating an example of overall processing of the AP 200-4 according to the embodiment.

If it is determined that the transmission power precision notification signal has been received (Step S441/YES), and it is determined that the data signal storing the transmission power information has been received (Step S442/YES), each AP 200-4 calculates difference information between the transmission power information estimated on the basis of reception power information and the received transmission power information (Step S443). Specifically, the control unit 230 calculates a difference between the transmission power estimated on the basis of the reception power densities and delivery losses of the received data signals and the transmission power indicated by the transmission power information stored in the data signals. Then, the control unit 230 causes the storage unit to store difference information related to the calculated difference.

Next, if it is determined that the calculated difference information is to be exchanged (Step S444/YES), the APs 200-4 exchanges a difference notification signal (Step S445). Specifically, if a predetermined amount of difference information is accumulated, the control unit 230 causes the data processing unit 210 to generate a difference notification signal storing the difference information and the received transmission power precision information. Then, the generated difference notification signal is transmitted by the wireless communication unit 220. In addition, if difference notification signals are received from the other APs 200-4, the control unit 230 acquires the difference information and the transmission power precision information stored in the received difference notification signals.

Next, the APs 200-4 form a group on the basis of the transmission power precision information, the calculated difference information, and the difference information obtained through the exchanging (Step S446). Specifically, the control unit 230 acquires statistical values by executing statistical processing on the stored difference information and transmission power precision information stored, and the received difference information and transmission power precision information. Then, the control unit 230 forms a multiple access communication group by using the acquired statistical values as transmission power precision information. Note that the statistical values may be used for reforming the multiple access communication group.

Then, if it is determined that notifications of the group are to be provided (Step S447/YES), the APs 200-4 transmit group notification signals (Step S448).

(Processing of STA)

Figure 15:
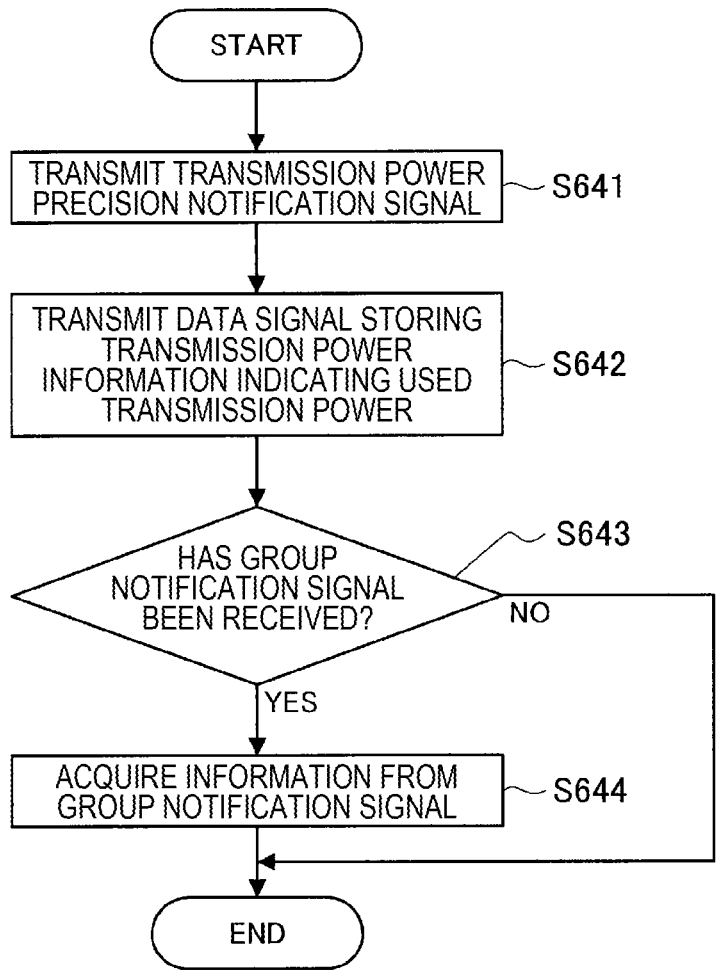
FIG. 15 is a flowchart conceptually illustrating an example of overall processing of the STA according to the embodiment.

Next, overall processing of each STA 100-4 will be described with reference to FIG. 15. FIG. 15 is a flowchart conceptually illustrating an example of overall processing of the STA 100-4 according to the embodiment.

The STAs 100-4 transmit transmission power precision notification signals (Step S641). In addition, the STAs 100-4 transmit data signals storing transmission power information indicating transmission power used (Step S642). Note that the transmission power precision information may be stored in data signals, and in that case, the transmission power precision notification signals may not be transmitted.

Next, if a group notification signal is received (Step S643/YES), the STA 100-4 acquires information from the group notification signal (Step S644).

<6.3. Summary of Fourth Embodiment>

According to the fourth embodiment of the present disclosure, the APs 200-4 receive the transmission power notification signals storing the transmission power information and transmit difference notification signals storing difference information related to differences between transmission power information stored in the transmission power notification signals and the transmission power information estimated from reception power as described above. Therefore, it is possible to share errors of transmission power recognized from signals that are actually transmitted with the other APs 200-4. Accordingly, it is possible to reduce differences in precision of signal reception by the individual APs 200-4 and to more precisely recognize the precision of the transmission power.

In addition, the APs 200-4 receive difference notification signals and controls destinations of the second signals on the basis of the difference information stored in the received difference notification signals and the estimated difference information. Therefore, it is possible to more effectively prevent reception properties from deteriorating, by the multiple access communication group being formed on the basis of precision of transmission power that is more precise than the transmission power precision information.

<7. Application Example>

The technology according to the present disclosure can be applied to various products. For example, the STA 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the STA 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the STA 100 may be wireless communication modules mounted in such terminals (for example, integrated circuit modules configured by one die).

On the other hand, for example, the AP 200 may be realized as a wireless LAN access point (also referred to as a wireless base station) which has a router function or does not have a router function. The AP 200 may be realized as a mobile wireless LAN router. The AP 200 may also be a wireless communication module (for example, an integrated circuit module configured with one die) mounted on such devices.

[7-1. First Application Example]

Figure 16:
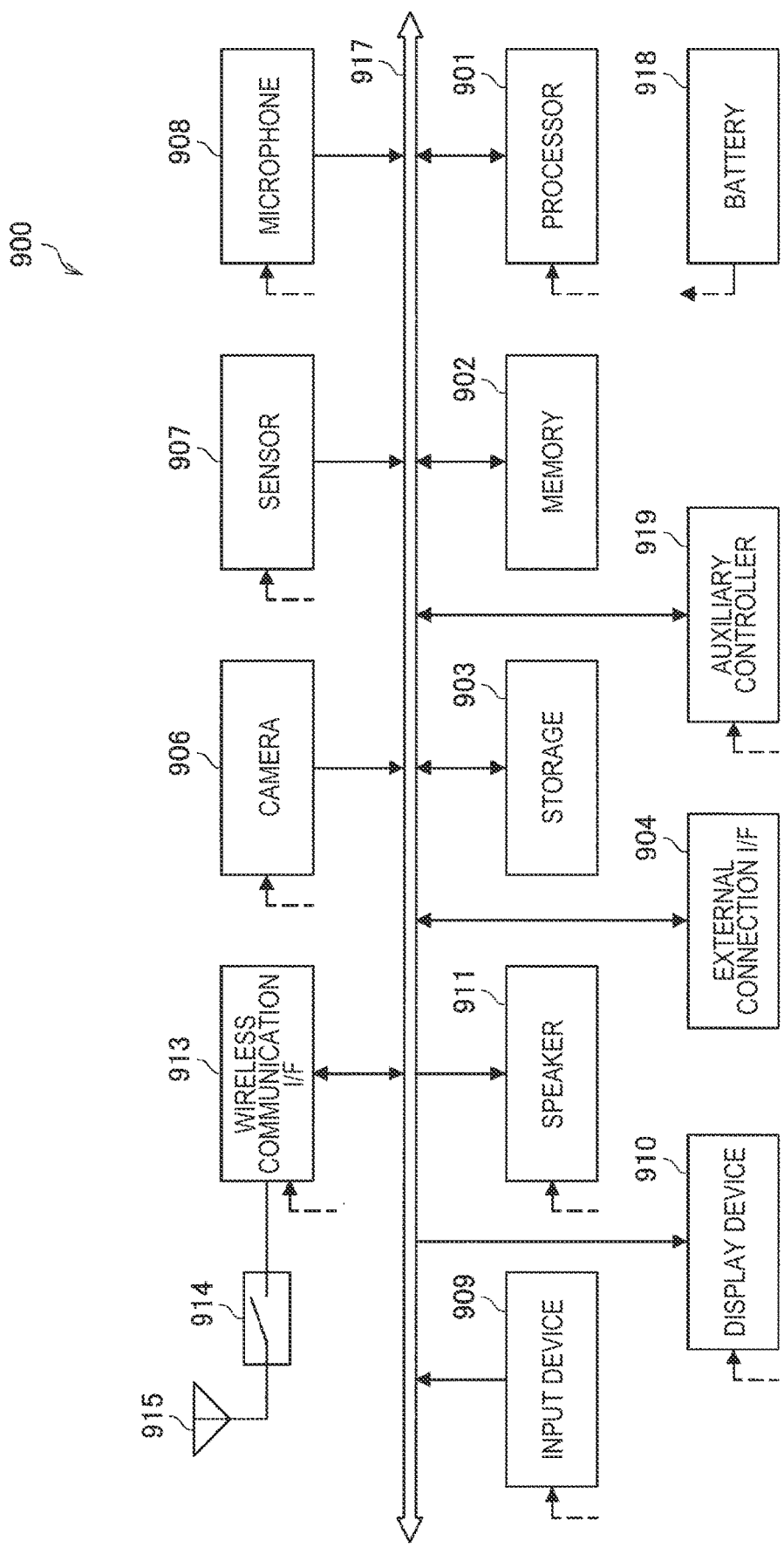
FIG. 16 is a block diagram illustrating an example of a schematic configuration of a smartphone.

FIG. 16 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 16. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 16 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 16, the data processing unit 110, the wireless communication Unit 120, and the control unit 130 described with reference to FIG. 2 may be mounted on the wireless communication interface 913. In addition, at least some of these functions may be mounted on the processor 901 or the auxiliary controller 919. For example, the control unit 130 transmits the first signal storing the transmission power precision information by using the data processing unit 110 and the wireless communication unit 120 and receives the second signal related to multiple access permission that is received thereafter. Then, the control unit 130 controls transmission of the third signal on the basis of the second signal. In this manner, it is possible to prevent reception properties in the AP 200 that receives the multiplexed third signal and communicates with the smartphone 900 from deteriorating.

Note that the smartphone 900 may operate as a wireless access point (software AP) as the processor 901 executes the function of an access point at an application level. In addition, the wireless communication interface 913 may have the function of a wireless access point.

[7-2. Second Application Example]

Figure 17:
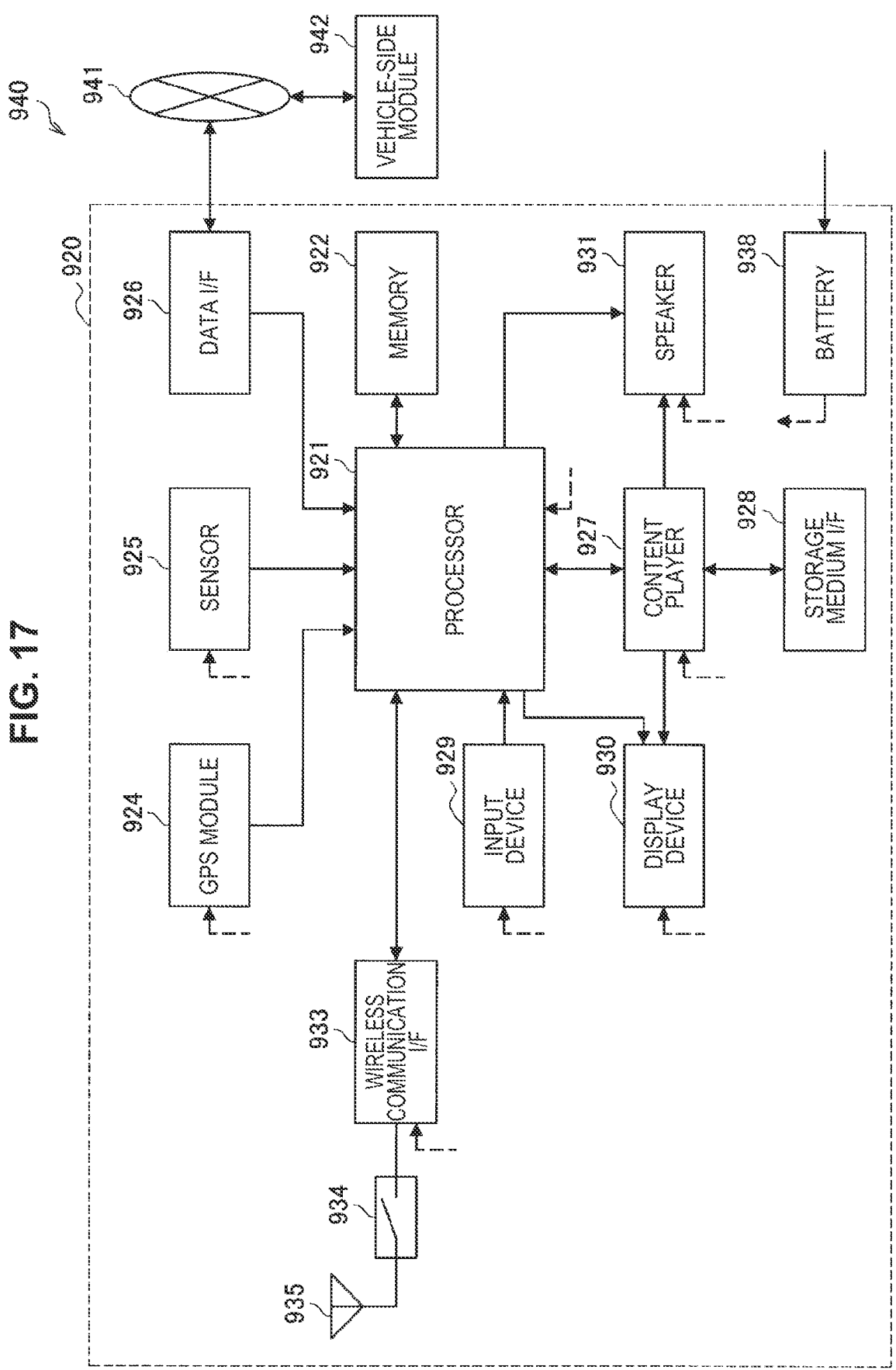
FIG. 17 is a block diagram illustrating an example of a schematic configuration of a car navigation device.

FIG. 17 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user.

The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 17. In this case, the antenna switch 934 may be omitted from the configuration of the car navigation device 920.

The battery 938 supplies electric power to each of the blocks of the car navigation device 920 illustrated in FIG. 17 via power supply lines partially indicated by dashed lines in the drawing. In addition, the battery 938 accumulates electric power supplied from the vehicle side.

In the car navigation device 920 illustrated in FIG. 17, the data processing unit 110, the wireless communication Unit 120, and the control unit 130 described with reference to FIG. 2 may be mounted on the wireless communication interface 933. In addition, at least some of these functions may be mounted on the processor 921. For example, the control unit 130 transmits the first signal storing the transmission power precision information by using the data processing unit 110 and the wireless communication unit 120 and receives the second signal related to multiple access permission that is received thereafter. Then, the control unit 130 controls transmission of the third signal on the basis of the second signal. In this manner, it is possible to prevent reception properties in the AP 200 that receives the multiplexed third signal and communicates with the car navigation device 920 from deteriorating.

In addition, the wireless communication interface 933 may operate as the aforementioned AP 200 and provide wireless connection to a terminal that a user on a vehicle has. At that time, the control unit 230 forms the multiple access communication group on the basis of the transmission power precision information stored in the first signal that is received via the wireless communication unit 220 and the data processing unit 210, for example. In addition, the control unit 230 uses the data processing unit 210 and the wireless communication unit 220 and causes the data processing unit 210 and the wireless communication unit 220 to transmit the second signal related to the multiple access permission to members of the formed multiple access communication group. In this manner, it is possible to prevent reception properties of the signal transmitted from the terminal that the user has and then multiplexed from deteriorating.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

[7-3. Third Application Example]

Figure 18:
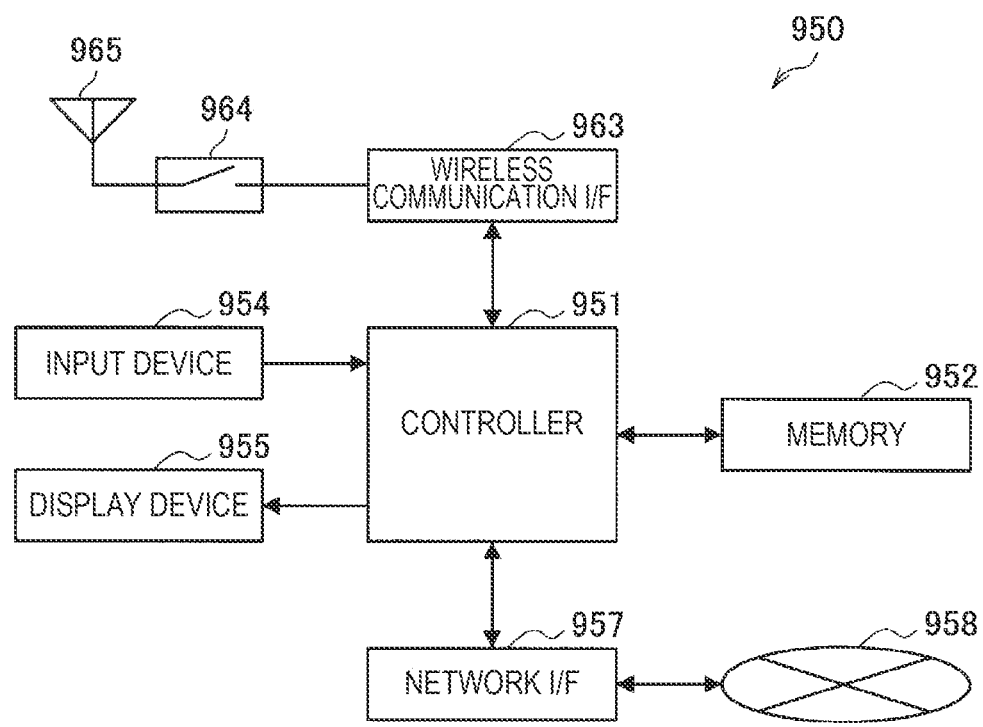
FIG. 18 is a block diagram illustrating an example of a schematic configuration of a wireless access point.

FIG. 18 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

The data processing unit 21, the wireless communication unit 220, and the control unit 230 described with reference to FIG. 2 may be mounted on the wireless communication interface 963 in the wireless access point 950 illustrated in FIG. 18. Also, at least a part of these functions may be mounted on the controller 951. For example, the control unit 230 forms the multiple access communication group on the basis of the transmission power precision information storing the first signal that is received via the wireless communication unit 220 and the data processing unit 210. Then, the control unit 230 uses the data processing unit 210 and the wireless communication unit 220 and causes the data processing unit 210 and the wireless communication unit 220 to transmit the second signal related to the multiple access permission to the members of the formed multiple access communication group. In this manner, it is possible to prevent reception properties of the signals transmitted from the terminals connected to the wireless access point 950 and multiplexed from deteriorating.

<8. Conclusion>

As described above, according to the first embodiment of the present disclosure, it is possible to suppress a gap between the reception power density and an assumed reception power density of signals that the AP 200-1 receives from the STAs 100-1 from increasing by the multiple access communication group being formed in consideration of the transmission power precision information. Therefore, it is possible to prevent reception properties from deteriorating in a case in which a plurality of STAs 100-1 simultaneously perform communication by distortion or the like of received signals being prevented.

In addition, according to the second embodiment of the present disclosure, it is possible to improve efficiency of communication by the STAs 100-2 with precision of transmission power that is less than the threshold value also performing the multiple access communication. Meanwhile, there is a concern that reception properties for the signals transmitted from the STAs 100-2 with precision of transmission power that is less than the threshold value may be further degraded than reception properties for signals transmitted from the STAs 100-2 with precision of transmission power that is higher than the threshold value. Thus, it is also possible to maintain a signal reception success rate for the group with a concern that the reception properties may relatively deteriorate, by changing communication parameters used in the multiple access communication for the groups with different precision o transmission power.

In addition, according to the third embodiment of the present disclosure, in a case in which an increase or a decrease in the members of the formed multiple access communication group has occurred, it is possible to optimize the number of members in the multiple access communication group by the multiple access communication group being reformed. Therefore, it is possible to improve efficiency of communication.

In addition, according to the fourth embodiment of the present disclosure, it is possible to share errors of transmission power recognized from signals that are actually transmitted with the other APs 200-4. Accordingly, it is possible to reduce differences in precision of signal reception by the individual APs 200-4 and to more precisely recognize the precision of the transmission power.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the AP 200 and the STAs 100 perform multiple access communication in the aforementioned embodiments, the present technology is not limited to such an example. For example, an STA 100 that has a direct link to a plurality of STAs 100 and the plurality of STAs 100 may perform multiple access communication. Note that in this case, the aforementioned DL communication can be understood as "simultaneous communication from one device to a plurality of devices" and the aforementioned UL communication can be understood as "simultaneous communication from the plurality of devices to the one device".

In addition, although the example in which the STAs 100 are divided into the group in which precision of the transmission power is relatively high and the group in which the precision of the transmission power is relatively low has been described in the aforementioned embodiments, a part of the STAs 100 decided as members of the latter group may be included in the former group. In this case, it is possible to prevent differences in the precision of the transmission power and thus differences in reception properties between the former group and the latter group from excessively increasing.

In addition, although the example in which the transmission power difference information is shared by APs 200 has been described in the aforementioned embodiments, the difference information may be shared between the AP 200 and the STAs 100. In that case, the processing of calculating the difference information is also performed in the STAs 100.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, it is also possible to produce a computer program for causing hardware incorporated in STA 100 and AP 200 to exhibit functions equivalent to those of the respective functional configurations of the aforementioned STA 100 and AP 200. In addition, a storage medium that stores the computer program therein is also provided.

Additionally, the present technology may also be configured as below.

(1)

A wireless communication device including:

a receiving unit that receives a first signal storing first information with which precision or accuracy of transmission power is recognized; and a transmission unit that transmits a second signal regarding permission of multiple access that allows simultaneous communication with at least one first wireless communication device identified on the basis of the first information.

(2)

The wireless communication device according to (1), in which the at least one first wireless communication device is identified on the basis of the first information and a threshold value regarding the first information.

(3)

The wireless communication device according to (2), in which the transmission unit transmits the second signal to a first transmission source of the first signal storing the first information that is equal to or greater than the threshold value.

(4)

The wireless communication device according to (3), in which the transmission unit transmits the second signal to a second transmission source of the first signal storing the first information that is less than the threshold value, and a communication parameter that is different from a communication parameter stored in the second signal that is transmitted to the first transmission source is stored in the second signal transmitted to the second transmission source.

(5)

The wireless communication device according to (4), in which the communication parameter includes a communication parameter regarding noise resistance for communication.

(6)

The wireless communication device according to (2) or (3), in which the transmission unit does not transmit the second signal to the first transmission source of the first signal storing the first information that is less than the threshold value, or transmits a signal indicating permission of single access.

(7)

The wireless communication device according to any one of (1) to (6), in which the second signal includes a transmission permission signal indicating permission of multiple access that allows simultaneous communication.

(8)

The wireless communication device according to any one of (1) to (7), in which the second signal includes a group notification signal that provides a notification about a group to which the first wireless communication device that is permitted to perform multiple access belongs, the multiple access allowing simultaneous communication.

(9)

The wireless communication device according to any one of (1) to (8), in which the multiple access that allows simultaneous communication includes frequency division multiple access, space division multiple access, or code division multiple access.

(10)

The wireless communication device according to any one of (1) to (9), in which the first information includes information regarding an error between a setting value and an actually measured value of transmission power.

(11)

The wireless communication device according to any one of (1) to (10), in which the transmission unit controls a destination of the second signal on the basis of a change in connection for communication with the first wireless communication device.

(12)

The wireless communication device according to any one of (1) to (11), in which the transmission unit controls a destination of the second signal on the basis of a change in the first information.

(13)

The wireless communication device according to any one of (1) to (12), in which the receiving unit receives a transmission power notification signal storing transmission power information, and the transmission unit transmits a difference notification signal storing difference information regarding a difference between the transmission power information stored in the transmission power notification signal and transmission power information estimated from reception power.

(14)

The wireless communication device according to (13),
in which the receiving unit further receives the difference notification signal, and
the transmission unit controls a destination of the second signal on the basis of the difference information stored in the received difference notification signal and the estimated difference information.

(15)

A wireless communication device including:
a transmission unit that transmits a first signal storing first information with which precision or accuracy of transmission power is recognized;
a receiving unit that receives a second signal regarding permission of multiple access that allows simultaneous communication after the transmission of the first signal; and
a control unit that controls transmission of a third signal on the basis of the second signal.

(16)

The wireless communication device according to (15),
in which the second signal includes a transmission permission signal indicating permission of the multiple access that allows the simultaneous communication, and
the control unit controls transmission of the third signal on the basis of a communication parameter stored in the transmission permission signal.

(17)

The wireless communication device according to (15) or (16),
in which the second signal includes a group notification signal that provides a notification about a group to which the first wireless communication device that is permitted to perform the multiple access belongs, the multiple access allowing simultaneous communication, and
the control unit controls transmission of the third signal in accordance with reception of a transmission permission signal indicating permission of the multiple access that allows simultaneous communication, which is directed to the group provided in the notification through the group notification signal.

(18)

The wireless communication device according to any one of (15) to (17), in which the transmission unit transmits a fourth signal that provides a notification about a change in connection for communication with a transmission source of the second signal or a change in the first information.

(19)

A wireless communication method including, by a processor:
receiving a first signal storing first information with which precision or accuracy of transmission power is recognized; and
transmitting a second signal regarding permission of multiple access that allows simultaneous communication to at least one first wireless communication device identified on the basis of the first information.

(20)

A wireless communication method including, by a processor:
transmitting a first signal storing first information with which precision or accuracy of transmission power is recognized;
receiving a second signal regarding permission of multiple access that allows simultaneous communication after the transmission of the first signal; and
controlling transmission of a third signal on the basis of the second signal.

REFERENCE SIGNS LIST

100 STA
200 AP
110, 210 data processing unit
120, 220 wireless communication unit
130, 230 control unit

The invention claimed is:

1. A wireless communication device, comprising:
processing circuitry configured to
receive a first signal from a first wireless communication device, the first signal including first precision information indicating a precision of a transmission power at the first wireless communication device, and the precision of the transmission power being a difference between a setting value at the first wireless communication device and an actually measured value of the transmission power measured at the first wireless communication device;
assign, based on the precision of the transmission power indicated in the first precision information, the first wireless communication device to a particular multiple access group; and
transmit a second signal to the first wireless communication device, wherein
the second signal includes a group notification frame which identifies the first wireless communication device in the particular multiple access group,
the second signal indicates a permission of multiple access and a notification of assignment to the particular multiple access group,
the permission of multiple access is based on the first precision information, and the permission of multiple access allows simultaneous communication with another wireless communication device belonging to the particular multiple access group.

2. The wireless communication device according to claim 1, wherein the first precision information indicates a grade classified in accordance with a numerical value of an error.

3. The wireless communication device according to claim 2, wherein the precision is equal to or greater than a threshold value.

4. The wireless communication device according to claim 3, wherein
the processing circuitry transmits the second signal to a second wireless communication device in which a second error, between a second setting value at the second wireless communication device and a second actually measured value of transmission power measured at the second wireless communication device, is less than the threshold value, and
a first communication parameter, that is different from a second communication parameter included in the second signal, is included in the first signal.

5. The wireless communication device according to claim 4, wherein the first communication parameter includes information regarding noise resistance for communication.

6. The wireless communication device according to claim 1, wherein the second signal includes a transmission permission signal indicating permission of multiple access that allows simultaneous communication.

7. The wireless communication device according to claim 1, wherein the multiple access that allows simultaneous communication includes frequency division multiple access, space division multiple access, or code division multiple access.

8. The wireless communication device according to claim 1, wherein the processing circuitry controls a destination of the second signal based on a change in connection for communication with the first wireless communication device.

9. The wireless communication device according to claim 1, wherein the processing circuitry controls a destination of the second signal based on a change in the first precision information.

10. The wireless communication device according to claim 1, wherein the processing circuitry is further configured to
receive a transmission power notification signal including transmission power information, and
transmit a difference notification signal including difference information regarding a difference between the transmission power information and transmission power information estimated from reception power.

11. The wireless communication device according to claim 10, wherein the processing circuitry is further configured to
receive the difference notification signal, and
control a destination of the second signal based on the difference information and the estimated difference information.

12. A wireless communication device, comprising:
processing circuitry configured to
transmit a first signal to a first wireless communication device, the first signal including first precision information indicating a precision of a transmission power at the wireless communication device, the precision of the transmission power being a difference between a setting value at the wireless communication device and an actually measured value of the transmission power measured at the wireless communication device;
receive a second signal indicating a permission of multiple access and a notification of assignment to a particular multiple access group, the permission of multiple access allowing simultaneous communication after the transmission of the first signal, the permission of multiple access having been determined based on first precision information, and the notification indicating that the wireless communication device is assigned to the particular multiple access group based on the precision of the transmission power indicated in the first precision information; and control, based on the second signal, transmission of a third signal via simultaneous communication with another wireless communication device belonging to the particular multiple access group, wherein the second signal includes a group notification frame which identifies the first wireless communication device in the particular multiple access group.

13. The wireless communication device according to claim 12, wherein
the second signal includes a transmission permission signal indicating permission of the multiple access that allows the simultaneous communication, and
the processing circuitry controls transmission of the third signal based on a communication parameter included in the transmission permission signal.

14. The wireless communication device according to claim 12, wherein the processing circuitry transmits a fourth signal that provides a notification about a change in connection for communication with a transmission source of the second signal or a change in the first precision information.

15. A wireless communication method, comprising:
receiving, by processing circuitry of a wireless communication device and from a first wireless communication device, a first signal including first precision information indicating a precision of a transmission power at the first wireless communication device, and the precision of the transmission power being a difference between a setting value at the first wireless communication device and an actually measured value of the transmission power measured at the first wireless communication device; assigning, based on the precision of the transmission power indicated in the first precision information, the first wireless communication device to a particular multiple access group; and transmitting, by the processing circuitry, a second signal to the first wireless communication device, wherein the second signal includes a group notification frame which identifies the first wireless communication device in the particular multiple access group, the second signal indicates a permission of multiple access and a notification of assignment to the particular multiple access group, the permission of multiple access is based on the first precision information, and the permission of multiple access allows simultaneous communication with another wireless communication device belonging to the particular multiple access group.

16. A wireless communication method, comprising:
transmitting a first signal, by processing circuitry of a wireless communication device to a first wireless communication device, including first precision information indicating a precision of a transmission power at the wireless communication device, the precision of the transmission power being a difference between a setting value at the wireless communication device and an actually measured value of the transmission power measured at the wireless communication device;
receiving a second signal indicating a permission of multiple access and a notification of assignment to a particular multiple access group, the permission of multiple access allowing simultaneous communication after the transmission of the first signal, the permission of multiple access having been determined based on first precision information, and the notification indicating that the wireless communication device is assigned to the particular multiple access group based on the precision of the transmission power indicated in the first precision information; and controlling, by the processing circuitry based on the second signal, transmission of a third signal via simultaneous communication with another wireless communication device belonging to the particular multiple access group, wherein the second signal includes a group notification frame which identifies the first wireless communication device in the particular multiple access group.

17. The wireless communication device according to claim 1, wherein the processing circuitry is further configured to determine the permission of multiple access based on the first precision information and to generate the second signal indicating the permission of multiple access.

* * * * *